(12) United States Patent
Jackson

(10) Patent No.: US 6,802,961 B2
(45) Date of Patent: Oct. 12, 2004

(54) DENSE FLUID CLEANING CENTRIFUGAL PHASE SHIFTING SEPARATION PROCESS AND APPARATUS

(76) Inventor: David P. Jackson, 22328 W. Barcotta Dr., Saugus, CA (US) 91350

( * ) Notice: Subject to any disclaimer, the term of this patent is extended or adjusted under 35 U.S.C. 154(b) by 0 days.

(21) Appl. No.: 10/221,767

(22) PCT Filed: Mar. 13, 2001

(86) PCT No.: PCT/US01/08054
§ 371 (c)(1),
(2), (4) Date: Sep. 12, 2002

(87) PCT Pub. No.: WO01/68279
PCT Pub. Date: Sep. 20, 2001

(65) Prior Publication Data
US 2003/0205510 A1 Nov. 6, 2003

Related U.S. Application Data

(60) Provisional application No. 60/189,079, filed on Mar. 13, 2000.

(51) Int. Cl.[7] .......................... B08B 3/06; B01D 33/80
(52) U.S. Cl. .......................... 210/86; 210/89; 210/149; 210/360.1; 210/391; 134/56 R; 134/148
(58) Field of Search .............................. 210/86, 90, 94, 210/149, 360.1, 391, 361, 360.2, 365; 494/10, 36, 29, 83; 134/147, 148, 153, 157, 56 R

(56) References Cited

U.S. PATENT DOCUMENTS

| | | | |
|---|---|---|---|
| 4,014,497 A | * | 3/1977 | Spiewok et al. ............... 494/56 |
| 5,344,493 A | * | 9/1994 | Jackson ......................... 134/1 |
| 6,328,897 B1 | * | 12/2001 | Leung ......................... 210/744 |

FOREIGN PATENT DOCUMENTS

WO WO 9623606 A1 * 8/1996 ............. B08B/3/10

* cited by examiner

Primary Examiner—Terry K. Cecil
(74) Attorney, Agent, or Firm—Jeffrey F. Craft; Paul Chancellor

(57) ABSTRACT

The present invention is an apparatus and process for cleaning substrates using dense fluids under the influence of centrifugal force and dense fluid phase changes. A perforated centrifuge drum operates within a pressure vessel having drains and fill ports. System controls include a high optical sensor, a low optical sensor, a pressure transducer, and a thermocouple. An external dense fluid cleaning and management system exchanges dense fluid and gas with the pressure vessel via the drain and fill ports. Dense fluid centrifugal separations prevent pooling and supercooling of liquid carbon dioxide avoiding recontamination of the substrate. The present invention can perform solvent-aided separation processes including liquid-liquid, liquid-supercritical-fluid, froth flotation and centrifugal phase-shift separations.

8 Claims, 21 Drawing Sheets

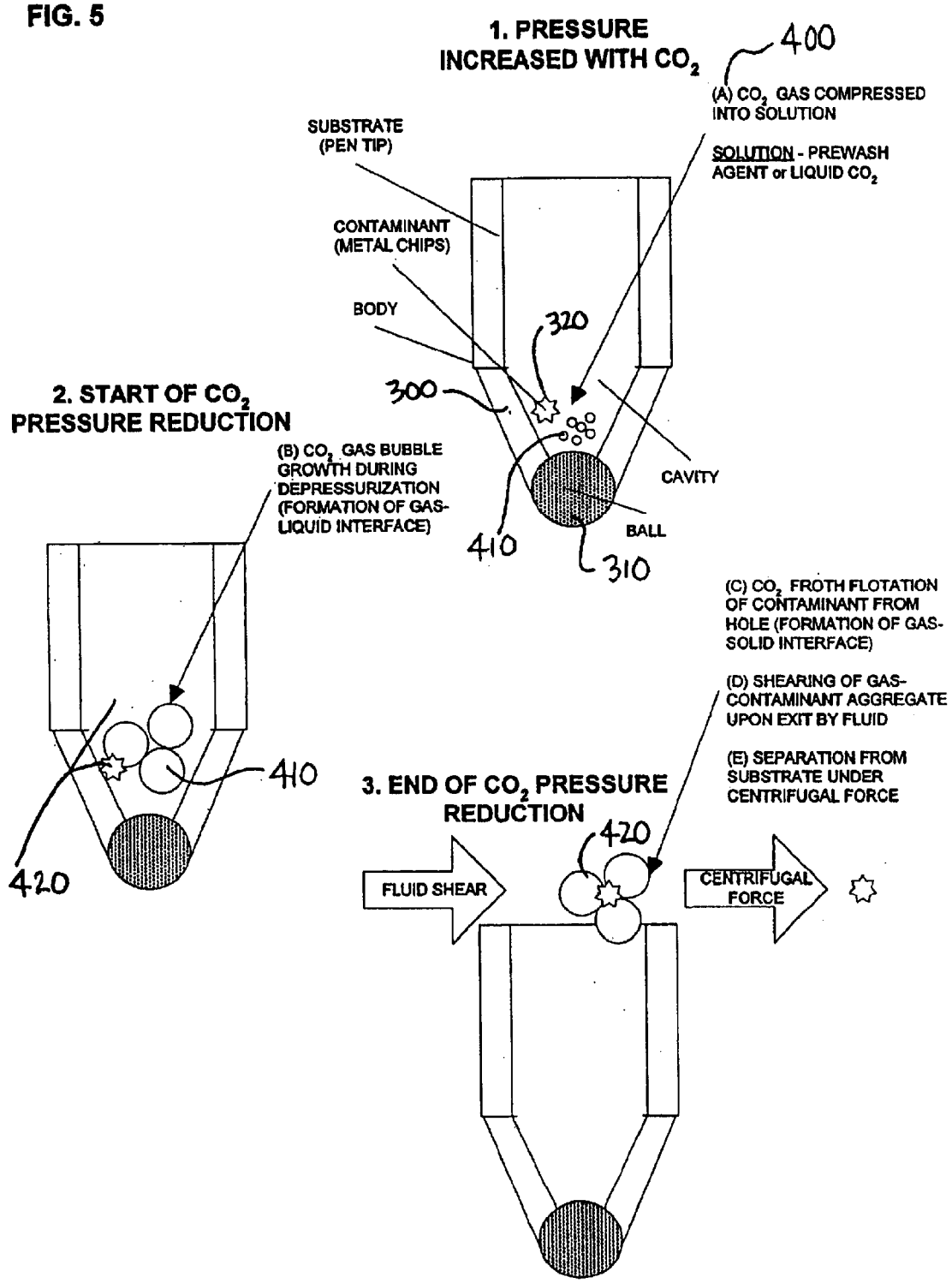

FIG. 6a
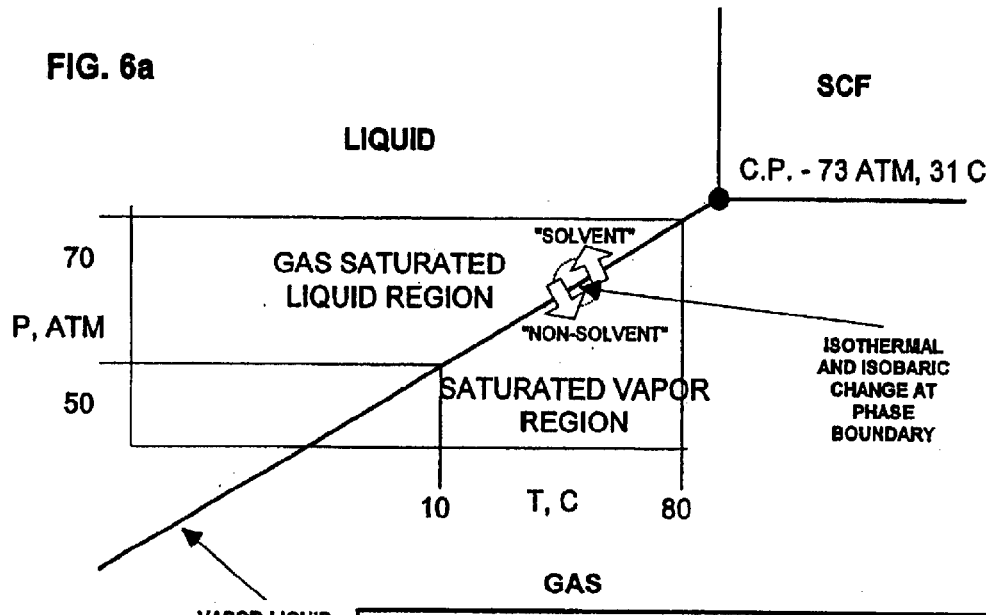
FIG. 6b NEAR-CRITICAL FLUID PHASE BOUNDARY CONDITIONS LIQUID PHASE
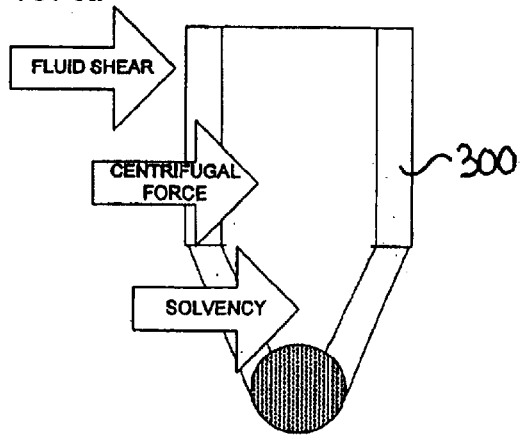
FIG. 6c NEAR-CRITICAL FLUID PHASE BOUNDARY CONDITIONS VAPOR PHASE
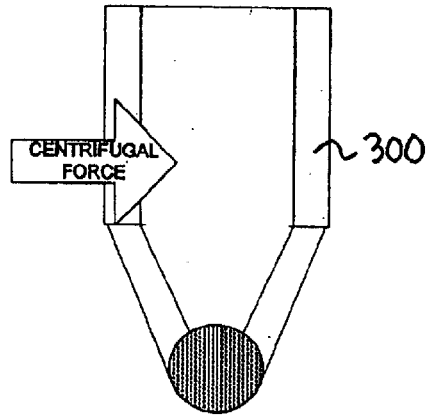

DENSE FLUID CLEANING CENTRIFUGAL PHASE SHIFTING SEPARATION PROCESS AND APPARATUS

This application is a 371 of PCT/US01/08054 filed Mar. 13, 2001 and claiming priority of U.S. provisional application No. 60/189,079, filed Mar. 13, 2000.

BACKGROUND OF INVENTION

1. Field of the Invention

The present invention relates to dense fluid cleaning. More particularly to the use of a dense fluid such as carbon dioxide in a process of centrifugal phase shifting separation as an environmentally sound alternative to organic solvents.

2. Related Art

Liquid-phase phase carbon dioxide cleaning devices and processes can be found in the art. However, none utilize a dense fluid centrifuge or centrifugal processes similar to those detailed herein.

Carbon dioxide exists as a low-density gas at standard temperature and pressure conditions and possesses phase boundaries with a triple point (Solid-Liquid-Gas co-exist in equilibrium like a glass of ice cubes and water) and a critical point (Liquid-Gas have identical molar volumes). Through pressure or temperature modification, carbon dioxide can be compressed into a dense gas state.

Compressing carbon dioxide at a temperature below its critical temperature (C.T.) liquefies the gas at approximately 70 atm. Cooling liquid-state or gas-state carbon dioxide to its freezing point causes a phase transition into solid-state carbon dioxide. Compressing carbon dioxide at or above its critical temperature and critical pressure (C.P.) also increases its density to a liquid-like state (5), however there is a significant difference between compression below and above the critical point.

Compressing carbon dioxide above its critical point does not effect a phase change. In fact, carbon dioxide at a temperature at or above 305 K (88 F.) cannot be liquefied at any pressure, yet the density for the gas may be liquid-like. At the critical point the density is approximately 0.47 g/ml. At or above this point carbon dioxide is termed a supercritical fluid (SCF). Supercritical carbon dioxide can be compressed to a range of liquid-like densities, yet it will retain the diffusivity of a gas. Continued compression of supercritical carbon dioxide causes continued increase in density, approaching that of its liquid phase.

Carbon dioxide is but one of the compounds which is adequate for use as the dense fluid in the within invention other compounds exhibiting suitable dense fluid properties include propane, butane, sulfur hexafluoride liquid nitrogen and liquid ammonia. Those skilled in the art will recognize that without exceeding the intended scope of this invention other compounds exhibiting similar dense fluid properties may be substituted for use in the herein described apparatus and processes.

The use of conventional dense fluid cleaning technology may result in a pooling and supercooling of liquid carbon dioxide trapped within pores and cavities of a substrate— leading to the formation of dry ice and recontamination of substrate. The process and apparatus to perform dense fluid centrifugal separations described herein results in precision cleaning using one unit volume of dense fluid per cleaning operation and ability to remove small insoluble particles from deep voids or cavities without dry ice formation or recontamination of the substrate Accordingly, the within dense fluid cleaning and separation apparatus and process overcomes limitations of conventional dense fluid technology and may provide an environmentally-safer cleaning and finishing alternative to organic solvents.

Definitions

The physicochemical cleaning processes and devices described herein are unique to this development field, each exhibiting distinctly different mixing and separation phenomenon. As such, unique terms have been invented herein to describe these processes and devices and are given below:

Dense Phase Carbon Dioxide is used herein to describe all phases of carbon dioxide: liquid state, supercritical state, dense gas state, and solid-state. These states have densities that are within the range of liquid-like or near-liquid substances.

Dense Fluid Centrifugal (Centripetal) Process A process whereby the substrates are rendered immobile under a variable centripetal force which is greater than the gravitational force, and are moved bi-directionally about a central axis in a rotatable drum in predominantly the vertical plane at a rotational velocity which is sufficient to prevent the substrates from mixing within the centrifuge compartment (the rotational velocity necessary is dependent upon centrifuge diameter and weight of substrates), but allows the dense fluid to flow freely at high fluid shearing velocity around and through the substrates. The Dense Fluid Centrifugal process described herein creates two dense fluid zones—(1) a turbulent cleaning zone located from the center of the centrifuge to outside of the centrifuge drum and a (2) non-turbulent separation zone located about the perimeter of the centrifuge wherein gravitational forces move separated contaminants circumferentially to the lower half for subsequent removal from the centrifuge through a drain port.

Dense Fluid Barreling Process: A process whereby the substrates are mixing bi-directionally under predominantly gravitational force, and are sliding over one another, predominantly in a segmented upper layer, as the barrel rotates slowly about a central axis in a rotatable drum in a plane between vertical and horizontal planes. The rotational velocity is maintained purposefully slow to prevent the substrates from damaging one another during mixing within the barrel compartment (the rotational velocity is dependent upon barrel diameter, weight and fragility of the substrates), but allows the dense fluid to flow freely at lower fluid shearing velocity around and through the substrates. The Dense Fluid Barreling process described herein creates only one dense fluid zone—(1) a semi-turbulent cleaning zone located below the center of the barrel compartment to the lower half of the barrel.

Dense Fluid Tumbling Process: A process whereby the substrates are mixing bi-directionally under predominantly gravitational force, and are sliding over one another, predominantly in a segmented upper layer, as the barrel rotates slowly about a central axis in a rotatable drum in the horizontal plane. The rotational velocity is maintained purposefully slow to prevent the substrates from damaging one another during mixing within the barrel compartment (the rotational velocity is dependent upon barrel diameter, weight and fragility of the substrates), but allows the dense fluid to flow freely at lower fluid shearing velocity around and through the substrates. The Dense Fluid Tumbling process described herein creates only one dense fluid zone—(1) a semi-turbulent cleaning zone located below the center of the barrel compartment to the lower half of the barrel.

Centrifugal Froth Flotation and Separation Process: A process whereby contaminant removal from within voids, cavities and interstitial layers is greatly enhanced by the combined scouring, cavitation and shearing phenomenon produced by the presence of gas-liquid interphases, gas-solid interphases and a variable and bi-directional centripetal force.

Centrifugal Phase Shifting Separation Process: A process whereby contaminant removal from within voids, cavities and interstitial layers is greatly enhanced by the combined scouring, cavitation and shearing phenomenon produced by the isobaric and isothermal exchange of saturated dense fluid vapor and saturated dense fluid liquid, under vapor-liquid equilibrium conditions, and simultaneously in the presence of a variable and bi-directional centripetal force.

SUMMARY OF THE INVENTION

The present invention selectively controls the phase change of carbon dioxide between a "solvent" phase (saturated liquid phase) and "non-solvent" phase (saturated vapor phase) at relatively constant pressure and temperature—isothermal and isobaric change. Precipitated contaminants are separated from a substrate contained in a turbulent "centrifugal zone" of the dense fluid centrifuge by centripetal force and "transported" by centripetal force to a non-turbulent and circumferential "separation zone" located at the walls of the dense fluid centrifuge. The present invention uses a process of controlled phase shifting no need to transfer contaminated fluid out of the cleaning vessel to prevent redeposition onto substrates.

Contaminants which are selectively soluble under one phase, pressure or temperature conditions and become insoluble when these conditions change may be separated out. The phase shift and separation processes are performed while variable centripetal forces, vortexing forces, and fluid shearing forces are simultaneously acting upon the substrate-contaminant-dense fluid system. The substrate is continuously experiencing a range of cleaning, scouring, washing and separation forces during the process.

A dense fluid centrifuge is also illustrated which can accommodate heavier and eccentric substrate loads, higher rotational velocities, different centrifuge drum designs, spray-under-immersion operations, and liquid-liquid extraction capability. It may also be oriented between the horizontal and vertical planes for improved process capability, system versatility and cleaning performance. Novel processes including centrifugal froth flotation and liquid-liquid extraction are also detailed used as in-situ adjuncts—enhancing additive mixing with carbon dioxide, extracting metallic fines/chips from deep dead-end holes of machined products, scouring particles from filaments of fabrics and performing cleaning of devices not possible using liquid carbon dioxide alone such as stripping plastic coatings from surfaces.

Another feature of the invention is a novel process for simultaneously contacting contaminants on substrates with a primary washing agent containing one or more additives and secondary dense fluid carbon dioxide—liquid-liquid and liquid-supercritical fluid extraction processes. A sequential cleaning operation is carried out in which powerful low viscosity solvents dissolve contaminants and contaminants and solvents are effectively transported away from the objects being cleaned. During such processes, a combination of cleaning actions may be produced—co-solvency, multi-phasic washing and froth flotation (during dense fluid phase depressurization cycles)—during simultaneous and continuous bi-directional centrifugal scouring of substrates in planes from vertical to horizontal.

The present invention also teaches a multi-ported spray manifold which is used for three operations, including (1) prewash spray-under-immersion and froth flotation operations, continuous filtered spray-under-immersion during centrifugal dense fluid extraction and froth flotation operations and (3) post-process substrate heat-up cycle.

Separation of insoluble contaminants (chips, particles, precipitated or reacted soils) is achieved by exerting a continuous and bi-directional centripetal force on substrate-contaminant-dense fluid system during these various operations in-situ. Tumble-cleaning operations may be performed in the present invention by rotating the dense fluid centrifuge into any position from vertical to the horizontal plane for the purpose of mixing, blending, polishing and deaggregating nested substrates. Tumble cleaning used in the present invention is primarily designed for textiles or "fixtured" metal substrates during prewash operations. Barrel cleaning is a slower and angled rotation which is adjustable to any angle from full vertical to full horizontal, used for polishing and cleaning.

Also noteworthy is the minimization of the explosive decompression of polymers through the centrifugal wringing action of the centrifuge in combination with a phase shift operation which exchanges liquid carbon dioxide with vapor having much lower molar volume (density) which in-turn reduces the risk of the explosion of the polymers during the expansion of liquid carbon dioxide allowed to remain in contact with the polymer.

Other features and advantages of the present invention will be set forth, in part, in the descriptions which follow and the accompanying drawings, wherein the embodiments of the present invention are described and shown, and in part will become apparent to those skilled in the art upon examination of the following detailed description taken in conjunction with the accompanying drawings, or may be learned by practice of the present invention. The advantages of the present invention may be realized and attained by means of the insturmentalities and combinations particularly pointed out in the appended claims.

BRIEF DESCRIPTION OF THE DRAWINGS

FIG. 2b is a side view of the barreling orientation for the embodiment of FIG. 2a, FIG. 2c is a side view of the Tumble orientation for the embodiment of FIG. 2a.

FIG. 5 is a process view of centrifugal froth flotation using a ball point pen tip as a substrate.

FIG. 6a is a graph of the conditions within saturated vapor phase, substrate conditions within saturated liquid phase, respectively.

FIGS. 6b and c are a process views of the conditions within saturated vapor phase, substrate conditions within saturated liquid phase using an ball point pen tip as a substrate.

DETAILED DESCRIPTION OF THE PREFERRED EMBODIMENTS

Figure 1A:
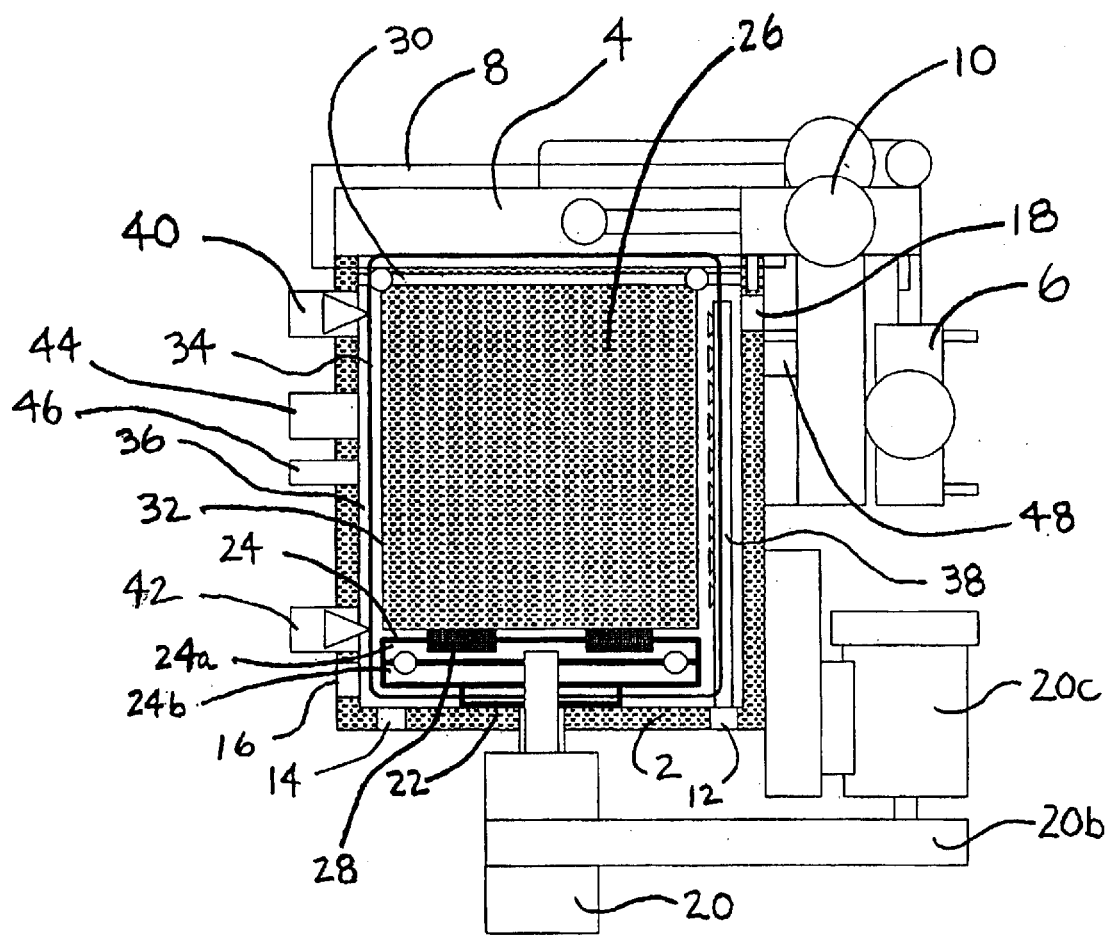
FIG. 1a is a side view of the preferred embodiment of the dense fluid centrifuge.

Shown in FIG. 1a is a side view of the dense fluid centrifuge used to perform the various processes of the present invention generally designated (1). The dense fluid centrifuge (1) has a high pressure vessel (2) with high pressure centrifuge lid (4) which is operated using a hydraulic lift cylinder (6). The centrifuge lid (4), when closed as shown, is secured to and seals the high pressure vessel (2) using a rotating locking ring (8) which is rotated using a hydraulic ring closure cylinder (10). The high pressure vessel (2) contains several ports for filling and draining the dense fluid centrifuge under isobaric and isothermic conditions. A fill port (12) is located in the lower half of the pressure vessel (2). A first drain port (14) used during draining in the vertical orientation of the dense fluid centrifuge is located in the lower half of the pressure vessel (2). A second drain port (16) used during draining in the horizontal orientation is located in the lower half of the pressure vessel (2). A vent port (18) is located in the upper half of the pressure vessel (2) and is used to transfer gas saturated vapor during isobaric filling and draining operations of the present invention. When the pressure vessel (2) is optionally rotated between vertical and horizontal orientations, the vent port (18) remains above the liquid phase contained within the pressure vessel. Within the pressure vessel (2) is housed a dense fluid centrifuge (1).

Forming the dense fluid centrifuge (1) is a magnetic or other suitable drive system (20) attached to the center of the bottom half of the pressure vessel (2) which contains a rotating shaft (20a) which feeds through a drive shaft seal (22) which is located and centered within and at the bottom of the pressure vessel (2) and into a slot (not shown) within the center of a specialized lower drum bearing (24). Also connected to the magnetic drive system is a drive belt (20b) which is affixed to a drive motor (20c) and the drive motor system has both variable rotational speed and direction.

Figure 2A:
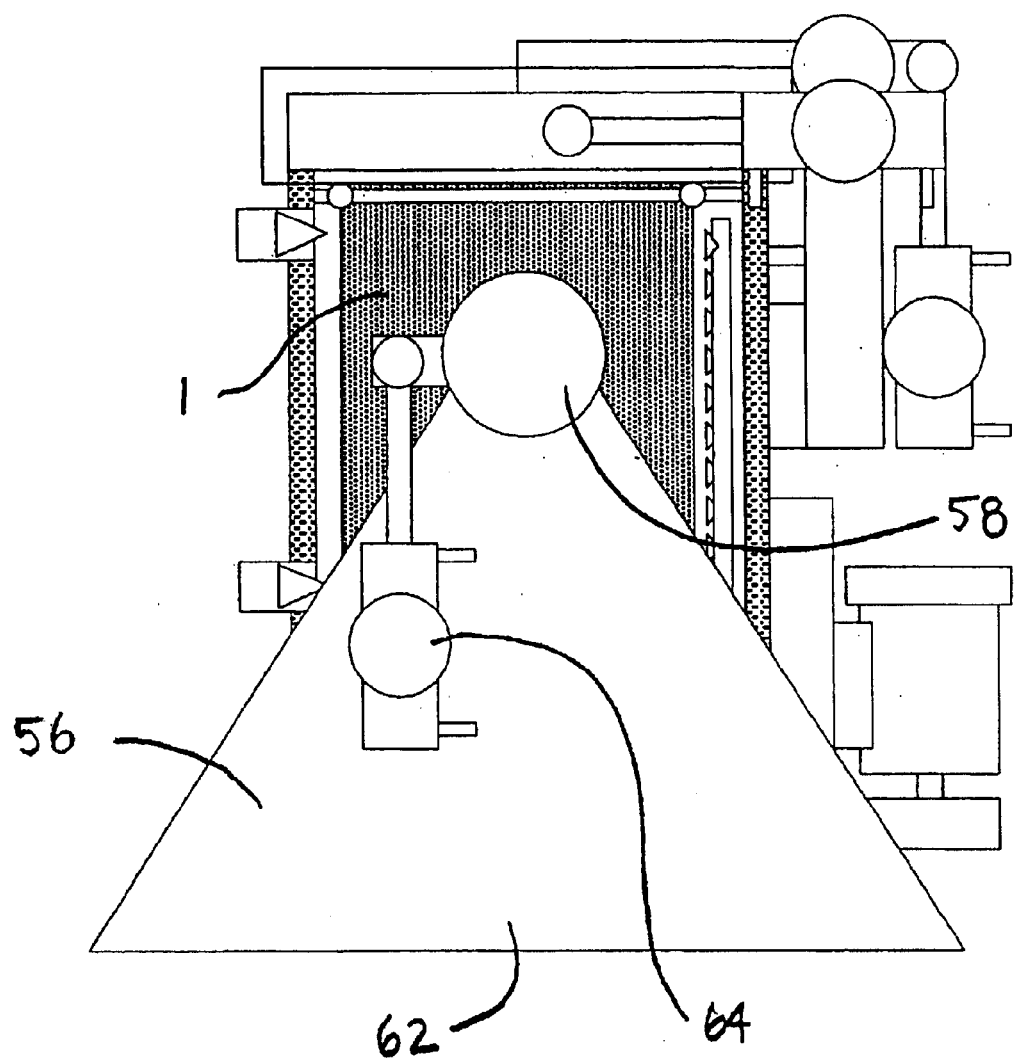
FIG. 2a is a side view of an alternative embodiment of the dense fluid centrifuge with a gimbal device, side view.
Figure 2B:
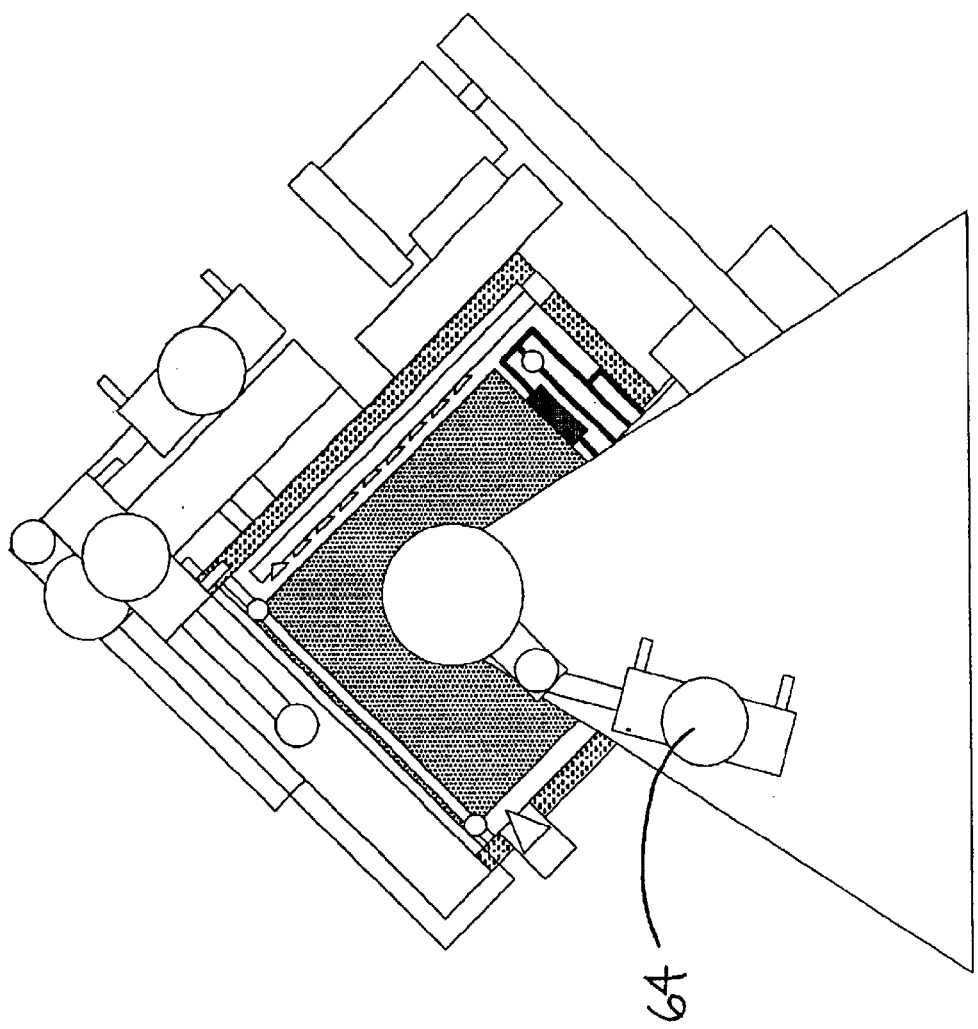
Figure 2C:
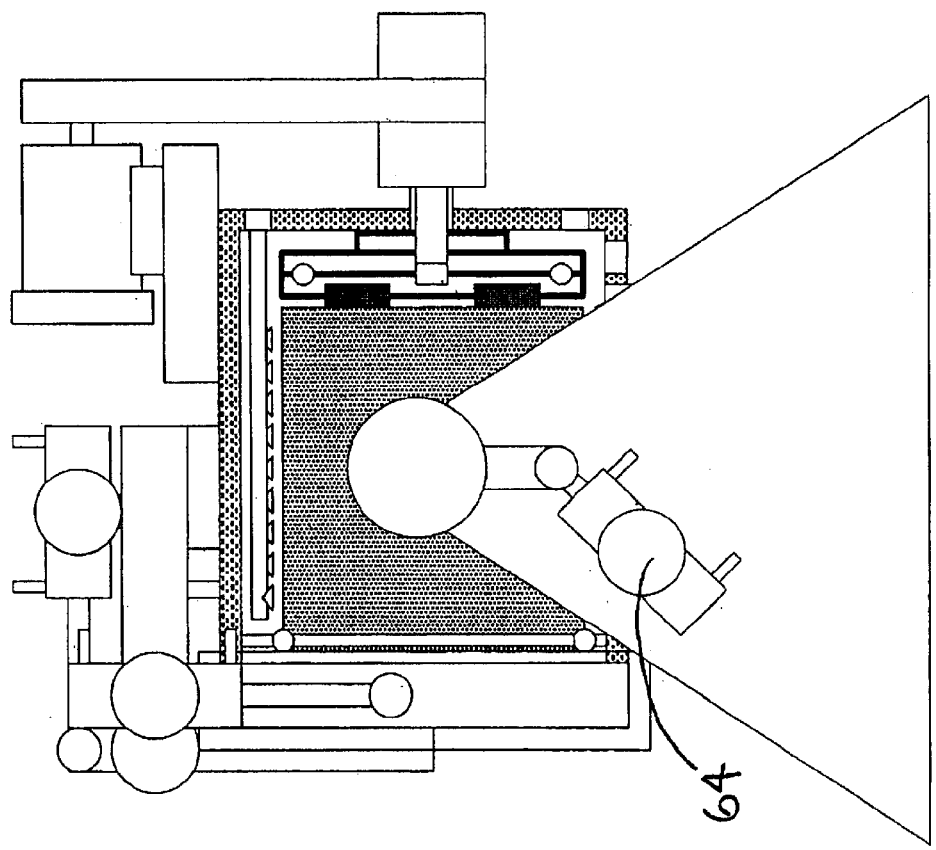

The lower drum bearing (24) is formed in two sections—an upper bearing plate (24a) and a lower bearing plate (24b) sandwiching a self-lubricating bearing (not shown). The lower drum bearing design is necessary to carry and distribute eccentric and heavy loads which may be present in the dense fluid centrifuge drum (26) under high rotational velocities or during optional gimbal rotations (FIGS. 2a-2c). The upper bearing plate (24a) rotates freely about the central axis—being directly connected to the rotating shaft (20a). The lower bearing plate is immobile and is affixed to the lower half of the pressure vessel (2). Optionally, drum load springs (28) may be affixed to the top of the upper bearing plate parts which are used to interface with the dense fluid centrifuge drum (26). The dense fluid centrifuge drum (26), which may have various shapes and sizes (FIGS. 11a–11e), is affixed to the upper bearing plate (24a), which then rotates freely, and at variable velocities, in a clockwise or counter-clockwise direction as determined by the rotation of the rotating shaft (20a) powered by an external magnetic or other suitable drive motor system (20). A upper bearing assembly (30), similar in design and function to the lower drum bearing 24, may be affixed to the upper half of the centrifuge drum (26) to support the centrifuge drum during high speed and eccentric load rotations and during optional gimbal rotations of the dense fluid centrifuge.

Within the interior of the dense fluid centrifuge (1) is a central centrifuge compartment (32) defined by a cylindrically shaped, but porous, stationary barrier, the centrifuge shield (34, which circumscribes the centrifuge drum (26) segregating off the centrifuge compartment (32) which is thereby separate from the pressure vessel's (2) interior walls and extends from the centrifuge lid (4) to the lower half of the pressure vessel (2) and contains the rotating centrifuge drum (26), lower drum bearing (24) and shaft seal (22). A second circumferential compartment is defined between the centrifuge shield (34) and inner wall of the pressure vessel (2) which defines a separation compartment or zone (36) which is baffled (not shown) to retard flow within this region. The centrifuge shield (34) both protects the pressure vessel (2) inner walls from potential impact by the rotating centrifuge and/or contents contained therein and provides zones of turbulent cleaning action (centrifuge compartment) and non-turbulent separation action (separation compartment).

Figure 1B:
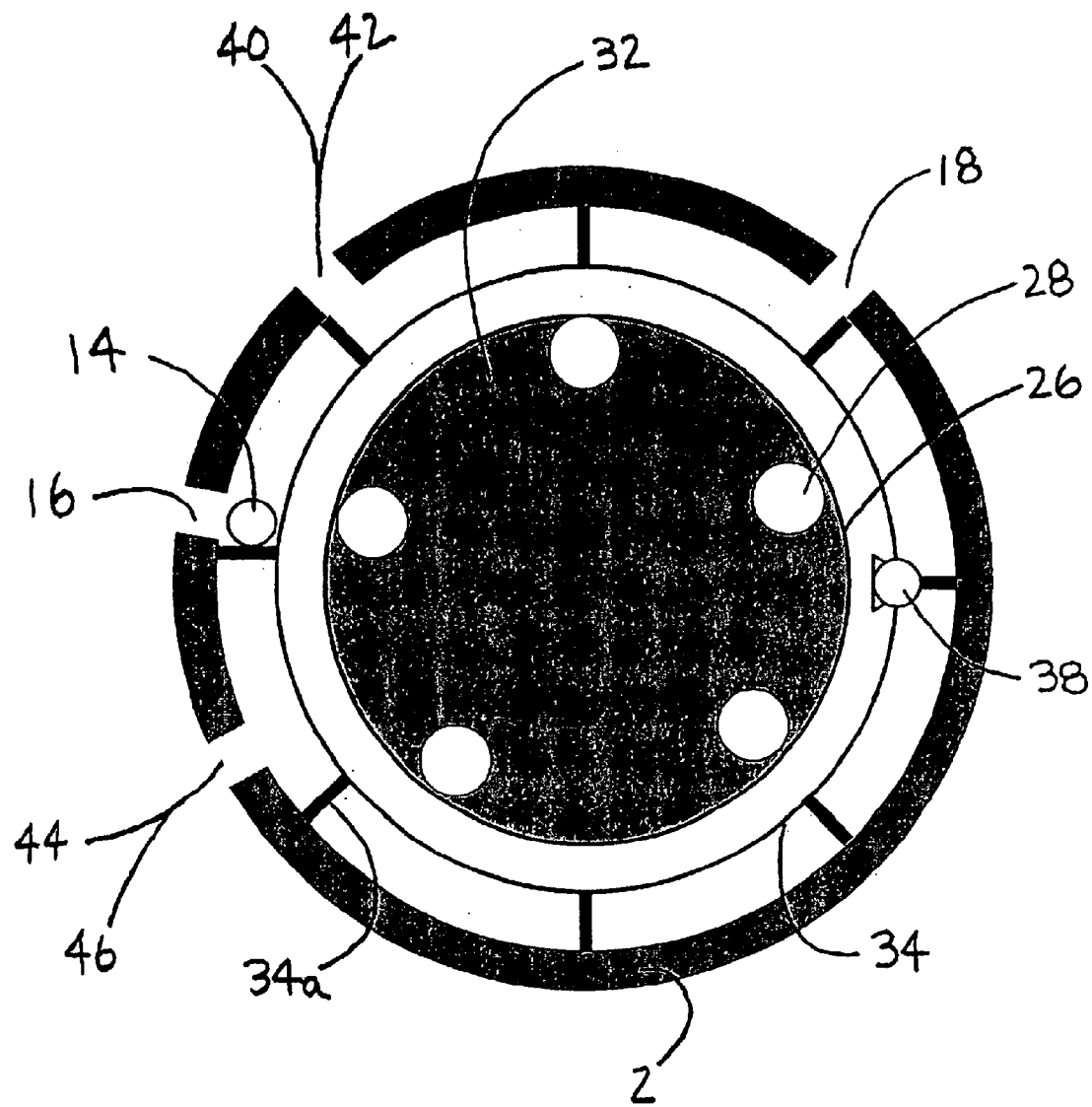
FIG. 1b is a top view of the dense fluid centrifuge compartment of the preferred embodiment.
Figure 1C:
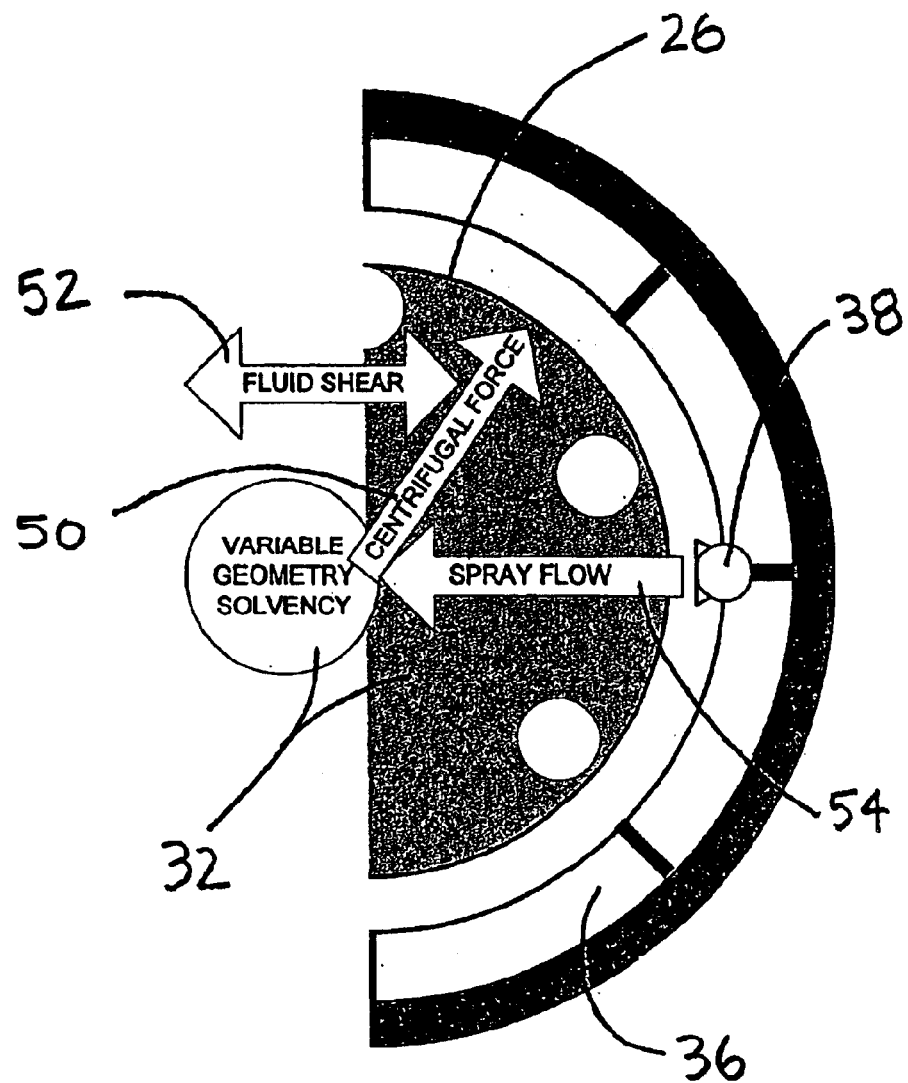
FIG. 1c is a diagram of dense fluid centrifugal separation phenomenon.
Figure 1D:
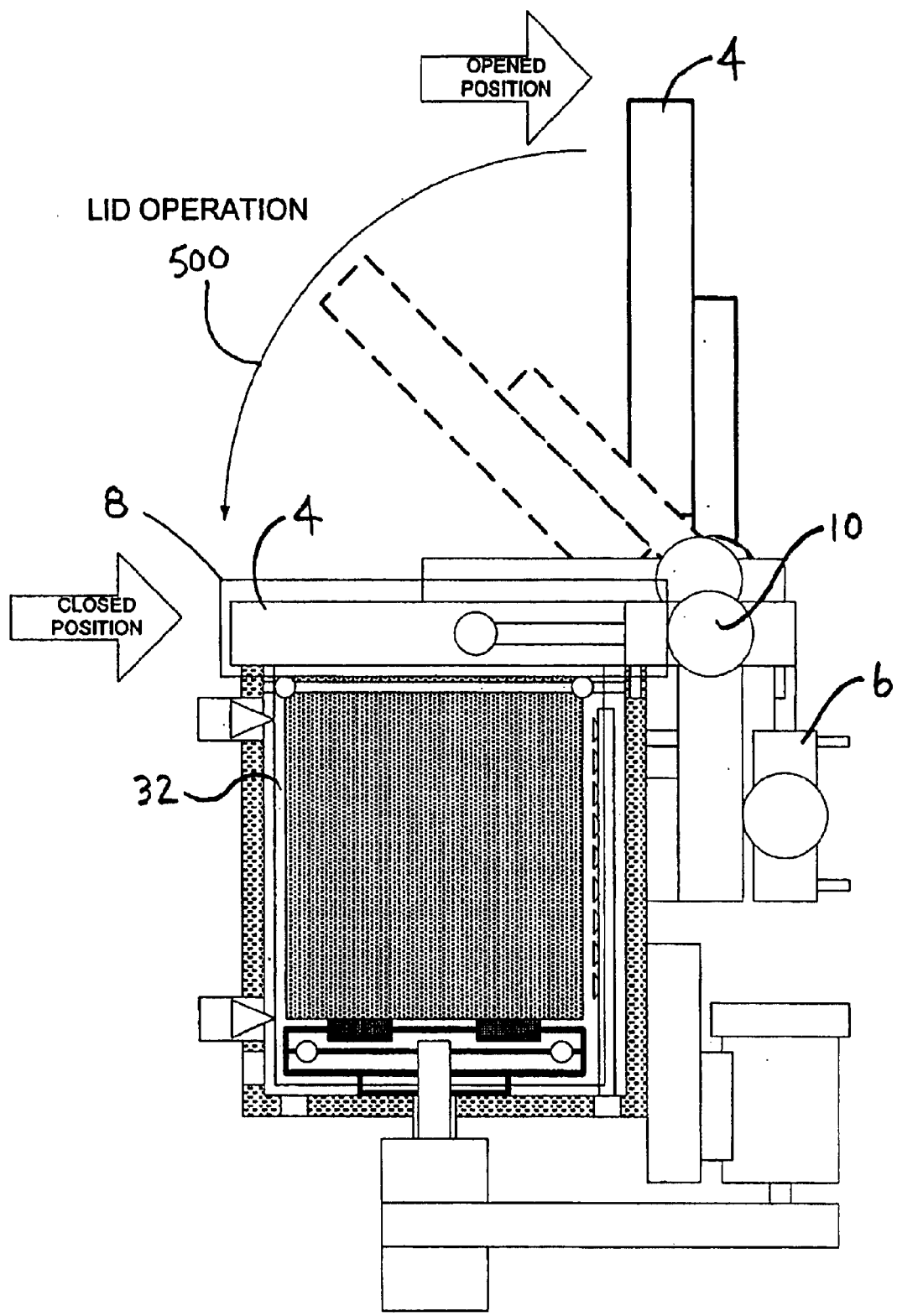
FIG. 1d is a side view of the cleaning vessel lid of preferred embodiment.

Shown in FIGS. 1a–1c is a multi-ported spray manifold (38) which is affixed to the centrifuge shield (34), and is connected to the fill port (12). The multi-ported spray manifold (38) is used to uniformly deliver dense fluid, admixtures, prewash agents and heating gas to the interior of the centrifuge compartment during the cleaning process.

Control of the phases of the carbon dioxide during the processes discussed herein using the dense fluid centrifuge is accomplished via optical sensors. Shown in FIG. 1a are optical sensors which are used to detect the presence or substantial absence of a liquid carbon dioxide phase. A high level optical sensor (40) is located substantially in the uppermost region of the pressure vessel (2) and is used to detect when the centrifuge compartment is full of liquid carbon dioxide and/or prewash agent. A lower level optical sensor (42) is located substantially in the lowermost region of the pressure vessel (2) and is used to detect when the centrifuge compartment is substantially empty of liquid carbon dioxide or prewash agent.

Control of the pressure and temperature during the cleaning process is accomplished using a pressure and temperature sensor. A pressure transducer (44) is connected located to the pressure vessel and is used to measure pressure conditions within the dense fluid centrifuge (1). A temperature thermocouple (46) is connected to the pressure vessel and is used to measure temperature conditions within the dense fluid centrifuge (1) and/or the separation compartment (36).

It should be apparent to those skilled in the art that a variety of pressure and temperature sensing and measuring devices may be interchangeably used to accomplish the pressure and temperature measurements within the dense fluid centrifuge (1) and such modifications are within the intended scope of this invention.

Although not essential to the device or process an optional vibration sensor (48) may be used to detect translated vibrations caused by eccentrically rotating loads contained within the centrifuge drum (26).

The dense centrifuge drum (26) is shown in FIG. 1a contained within the interior of the centrifuge compartment (32) defined by the centrifuge shield (34). The centrifuge shield (34) has affixed to it baffles (34a), which may be solid or perforated and which retard fluid flow within a separation compartment (36) created between said centrifuge shield (34) and the inner wall of the pressure vessel (2). The multi-ported spray manifold (38), shown affixed to the centrifuge shield (34), sprays dense fluid, admixtures, pre-wash agents and hot air into the interior of the centrifuge compartment (32). The vent port (18) is located within the separation zone (36) as are first drain port (14) and the second drain port (16).

FIG. 1c is a flow diagram of the cleaning and separation phenomenon associated with rotation of the centrifuge drum (26) in either direction and at various rotational velocities which imparts a centrifugal force (50) upon the substrates, dense fluid and/or admixtures contained therein (all not shown). Moreover, rapid rotational velocity in either direction produces a fluid shearing force (52) which imparts scouring vortices to the substrates being cleaned. Delivering dense fluid through the multi-ported spray manifold (38) during centrifugation also delivers additional cleaning and separation energy via the spray flow (54) from the multi-ported spray manifold (38) directed towards the substrates (not shown) which opposes the centrifugal and fluid shearing forces. The physicochemistry within the centrifuge compartment (32) is modified during centrifugation which determines the cleaning and/or separation phenomenon therein.

The dense fluid centrifuge produces two simultaneous processes cleaning and separation. The cleaning action occurs within a cleaning zone which is very turbulent as indicated by a Reynolds number (Nr) of at least 1000 and more preferably in a range of 1000 to 10000 and most preferably above 10,000 and separation action within a separation zone which is highly non-turbulent with a Nr<1,000 and more preferably between 1000 and 0. Within the device during its contaminated fluids and solids are concentrated and segregated under centrifugal force, isolated from the processed substrates contained within the centrifuge compartment (32). Contaminates are withdrawn from the separation compartment (36) and clean dense fluids are introduced into the centrifuge compartment via the multi-ported spray manifold (38).

After placing a substrate for cleaning into the dense fluid centrifuge compartment (32) the centrifuge lid (4) is rotated down to the closed position using a hydraulic lid cylinder (6). Following this, the locking ring (8) is rotated about the centrifuge lid (4) using a locking ring hydraulic cylinder (10). The high pressure lid, when in the closed position, defines and seals the uppermost half of the centrifuge compartment (32).

An alternate embodiment of the dense fluid centrifuge (1) combined with a gimbal device (56), shown in FIGS. 2a–c. A gimbal pivot assembly (58) is affixed to the dense fluid centrifuge (1) at two central but opposite connection points and movably anchored a gimbal base (62) a hydraulic cylinder (64) is used to rotate the gimbal pivot assembly (58) and connected dense fluid centrifuge (1). The gimbal device (56) provides a stable platform from which the dense fluid centrifuge (1) can be rotated to any orientation from vertical (as shown) to horizontal orientation. The dense fluid centrifuge may be used in an upright orientation (FIG. 2a), a barreling orientation (FIG. 2b), a tumbling orientation (FIG. 2c), or any combination thereof.

Figure 3:
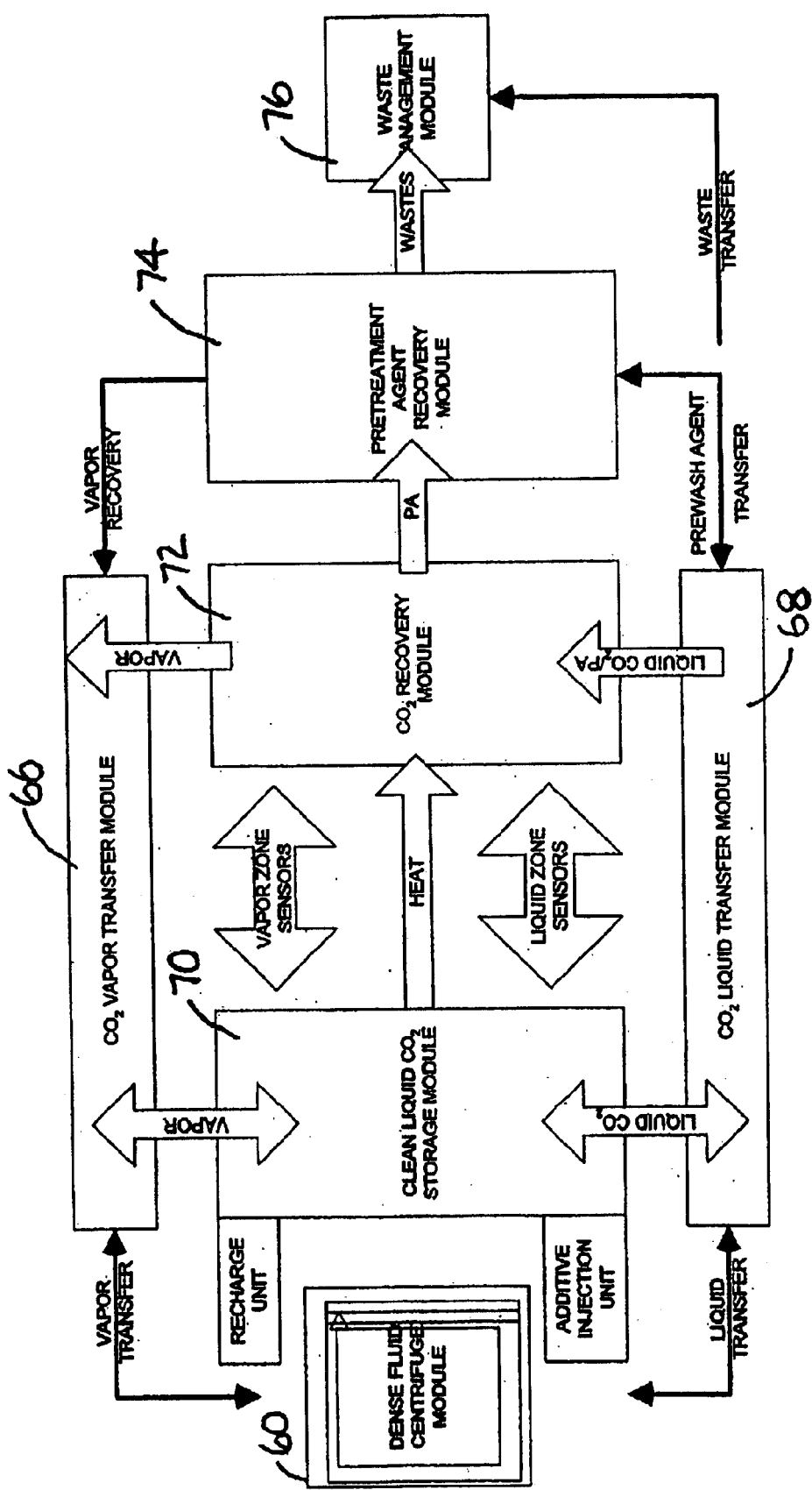
FIG. 3 is a flow diagram of an integrated centrifugal dense fluid cleaning system and fluids management system.

A flow diagram of the integrated dense fluid cleaning and Management system is provided in FIG. 3. The dense fluid cleaning and management system provides automatic isobaric filling and draining operations during dense fluid phase shift cleaning processes, carbon dioxide recovery and pre-wash agent delivery and recovery operations of the present invention. Vapor and liquid phase fluid transfers are accomplished using a vapor transfer module (66) and liquid phase transfer module (68) located at the upper and lower halves, respectively, of a dense fluid clean liquid carbon dioxide storage module (70) and carbon dioxide recovery module (72) in relation to the upper and lower halves of the dense fluid centrifuge (60). Also contained in the integrated dense fluid cleaning and management system is a pretreatment agent recovery module (74) and a separated waste management module (76).

The purpose and interaction of each module is detailed below.

The dense fluid centrifuge module (60) contains the dense fluid centrifuge (1) and may also contain the optional gimbal device (56). Vapor and liquid-phase dense fluid is exchanged, via ports, under isobaric and isothermal conditions between this module and the Clean Liquid $CO_2$ Storage Module (70) and $CO_2$ Vapor Recovery Module (72) through a vapor port connect to a vapor zone within the upper half of the dense fluid centrifuge (1) and from the lower half of the dense fluid centrifuge (1) through a liquid port. Pretreatment Agent (74) and Waste Management Modules (76) may also be added.

The clean liquid $CO_2$ storage module (70) contains and maintains condensed-phase carbon dioxide under vapor-liquid equilibrium conditions. Makeup carbon dioxide from an external supply source is delivered to this module as needed. An additive injection unit may also be connected to this module.

The $CO_2$ recovery module (72) Fractionates dirty dense fluid received from dense fluid centrifuge (or clean liquid $CO_2$ storage module) into liquid- and gas-phase constituents. A $CO_2$ vapor recovery pipe connects the vapor zone of this module to the vapor transfer module. A liquid recovery pipe connects the liquid zone to the pretreatment agent or waste management Systems.

The $CO_2$ vapor transfer module (66) Houses the vapor transfer bridge, vapor pump, aerosol stripper and optional vapor treatment device. This module is located in the vapor zone of the fluid management system. A pipe connects the separated aerosols from the aerosol separator to the liquid zone of the $CO_2$ recovery module. This module connects to the vapor zones of the $CO_2$ recovery module (72) and dense fluid centrifuge module (60) via the vapor transfer bridge. This module maintains relatively constant pressure between all connected modules. Optional catalytic and metal oxide treatment unit and supercritical ozonation unit (both not shown) can be used in-line on the vapor transfer bridge to increase the purity level of the resulting clean liquid $CO_2$ and provide additive chemistry to the dense fluid centrifuge module, respectively.

The $CO_2$ liquid transfer module (68) Houses the liquid transfer bridge, liquid pump and in-line filter. This module is located in the liquid zone of the fluid management system. This module connects to the liquid zone of the Dense Fluid Centrifuge Module and the liquid zone of the $CO_2$ Recovery Module via the liquid transfer bridge.

The pretreatment agent management module (74) is an optional subsystem which houses the prewash agent, agent pretreatment devices, delivery and return pump, valves and level control devices for delivery of prewash agent to and from dense fluid centrifuge or return of additives back to the optional additive injection unit. A $CO_2$ vapor recovery line connects this module to the vapor transfer module.

The waste management module (76) is another optional subsystem collects and stores the separated pre-spin waste, contaminants and spent prewash agent and residues. A pipe connects the liquid zone of this module to the liquid zones of the $CO_2$ Recovery Module and Pretreatment Agent Recovery Module.

Finally, an optional recirculation pump and filter element may be placed located in the liquid to perform a continuous centrifugal spray wash or centrifugal spray-under-immersion enhancement for the pretreatment and phase-shift extraction operations.

High pressure High Level Optical Sensors (HLOS), located in the vapor zones, and Low Level Optical Sensors (LLOS), located in the liquid zones, are employed herein to measure dense fluid phase levels in the dense fluid centrifuge, clean liquid $CO_2$ storage and $CO_2$ recovery modules during phase-shifting, pre-wash, vapor recovery and recharge operations.

A heat pump is used to remove heat from the clean liquid $CO_2$ storage module and input heat into the $CO_2$ recovery module. Vapor and liquid are maintained under relatively equilibrium conditions and dense fluid transfers between modules are performed with less energy input. Under these conditions, vapor and liquid transfers can be made without a mechanical pump, using only differences in density and vapor-liquid boundary elevations between modules to perform the transfer operations—as in during centrifugal phase-shift separation operations. For example, saturated liquid flows from the Clean Liquid $CO_2$ Storage Module into the Dense Fluid Centrifuge Module via the liquid transfer bridge as saturated vapor is returned from the vapor zone of the Dense Fluid Centrifuge Module back to the vapor zone of the Clean Liquid $CO_2$ Storage Module via the vapor transfer bridge. Following which, saturated dirty liquid will flow from the Dense Fluid Centrifuge Module to the $CO_2$ Recovery Module (provided that the liquid zone level therein has been distilled to a level that is lower than the Dense Fluid Centrifuge Module) during which saturated vapor flows through the vapor transfer bridge into the vapor zone of the Dense Fluid Centrifuge Module.

Figure 4A:
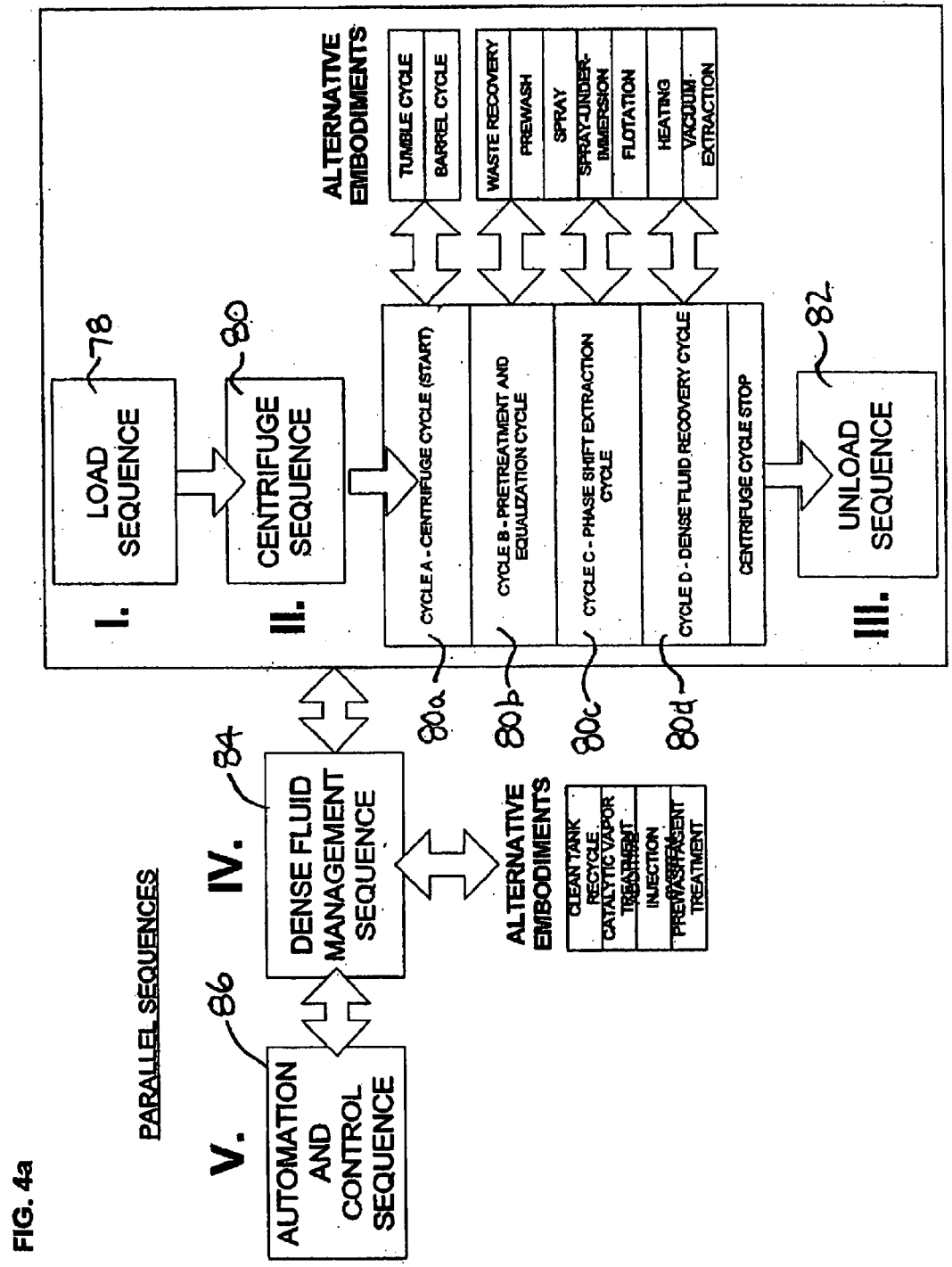
FIG. 4a is a flow diagram of the centrifugal dense fluid cleaning process.

An overview of the dense fluid centrifugal cleaning and management process is illustrated in FIG. 4a which shows the five major sequences of the process.

Sequence I, is the load sequence (78) wherein substrates are placed into a basket (FIG. 11c) or other suitable centrifuging fixture and placed into the high pressure vessel and specifically into the centrifuge drum. The door or lid is closed and the process is ready to start.

Sequence II, the "Centrifuge Dense Fluid Sequence" (80) is separated into four cycles A-D, some of which are optional. During cycle A (80a) the centrifuge begins to oscillate in a bi-directional rotation at a preset ramp rate between a maximum and minimum rotational speed and acceleration rate. This sequence continues throughout the rest of the sequence. Alternatively, tumble and barrel cycles can be set at this point for subsequent and optional gimbal operations (FIGS. 2b and 2c).

Cycle B (80b) is an equalization step which may include an optional a pre-spin cycle to remove gross contaminants which are now being spun from the substrates following which an optional prewash cycle which can precondition, react with or otherwise modify the contaminants contained on the substrate may be added. These optional steps involve centrifugal froth flotation and multiphase cleaning (liquid-gas, liquid-liquid and liquid-SCF extractions) to assist in scouring and scrubbing tough contaminants from substrates. After, or in the absence of, the above optional steps the equalization step is performed to equalize the vapor zone pressures between the vapor transfer module and dense fluid centrifuge module.

Cycle C (80c) is an optional cycle the phase shift extraction cycle which may contain an centrifugal froth flotation step. This step is similar to the Cycle B optional prewash frothing step, although it uses only $CO_2$ pressure adjustments, to create scrubbing bubbles to assist with scouring and centrifuging fine particles from substrates.

Cycle D (80d) is another optional cycle wherein dense fluid is recovered. Optional centrifugal gas heat up or thermal vacuum extraction processes are performed at this point. Following these optional post-treatment operations, the centrifuge cycle is stopped (no motion).

Sequence III, is the unload sequence (82) at this point the lid is opened. The substrates contained in the basket or fixture are removed from the centrifuge drum and the cleaning process is ended.

Sequence IV, the dense fluid management sequence (84) occurs in parallel with the three sequences described above, dense fluid, prewash agent and waste are managed in the background. Using the modules previously described, dense fluids are distilled, filtered, transferred, chemicals added to, and vapor is purified and condensed. Prewash agents and wastes are managed in separate operations.

Sequence V is the automation and control sequence (86) it occurs in parallel with the four sequences described above, electronic measurements are made continuously within each module and include phase determination, level determination, pressure, temperature, rotational speed, vibration, centrifuge orientation angle and lid closure state, among many others. Electronic sensors, a PLC or PC and software are required to perform the measurements and tasks described herein.

Figure 4B:
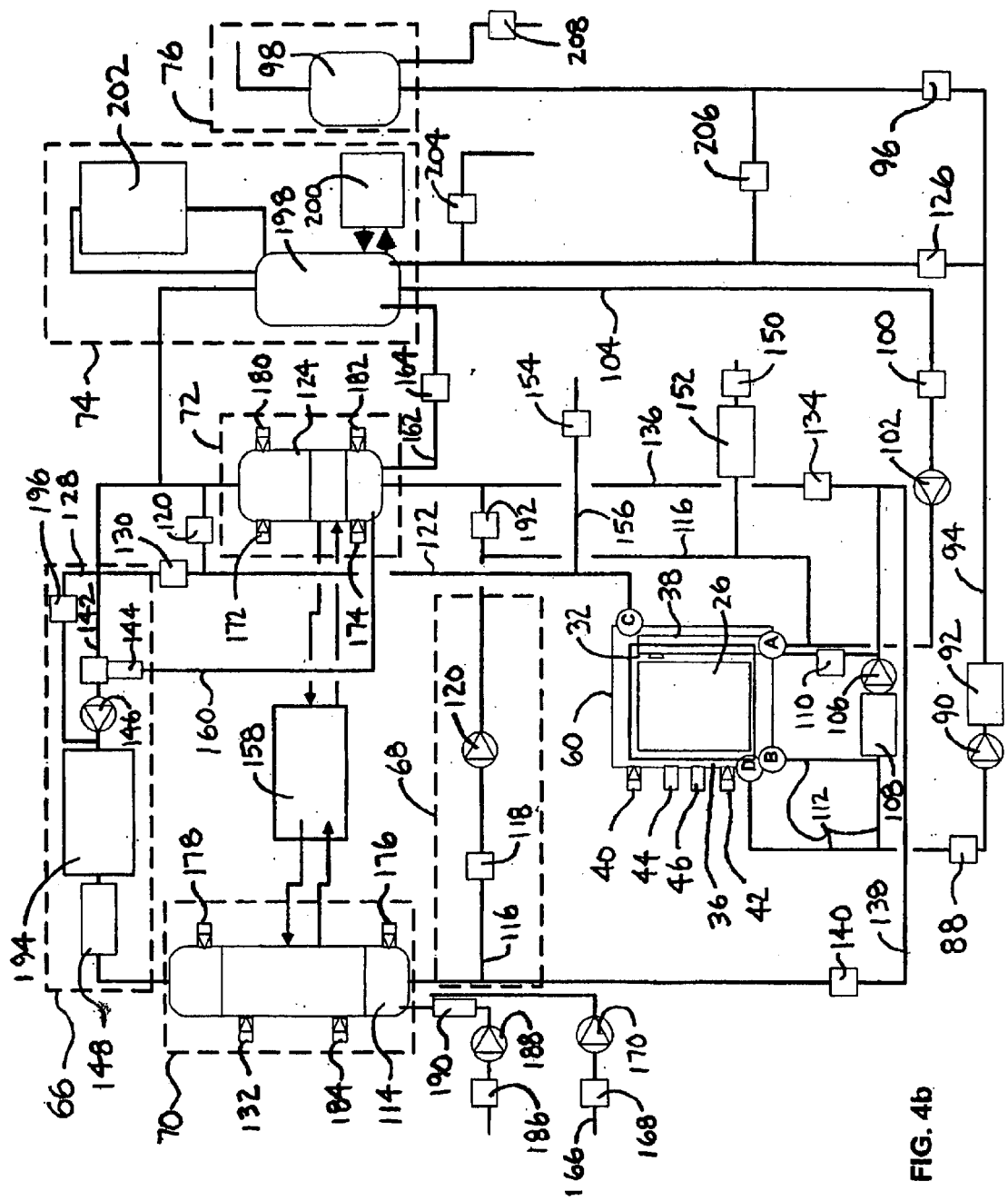
FIG. 4b is a schematic of the centrifugal dense fluid phase shift and froth flotation cleaning system.

A detailed illustration of the dense fluid centrifugal cleaning and management process is shown in FIG. 4b which further distills the five general sequence illustrated in FIG. 4a in to a sequence of steps.

Sequence I, (also Step 1) is the "Load Sequence" (78): during the "load sequence" the substrates are loaded into a suitable basket of fixture and placed into dense fluid centrifuge drum (26) and the centrifuge lid is closed and locked using hydraulic closure control and locking ring mechanisms (FIGS. 1a–d). The system is now ready for prewash, extraction and recovery sequences.

Sequence II, the "Centrifuge Dense Fluid Sequence" (80) is separated into four cycles A–D, some of which are optional.

Cycle A:

Step 2 begins by rotating the centrifuge drum (FIG. 1a, 26) containing substrates in the dense fluid centrifuge in a clockwise or counterclockwise direction at between about 50 and about 500 rpm, ramping up to between a pre-selected upper and lower centrifuge speed and acceleration rates that are as fast as permissible by the magnetic coupling of the drive (i.e., about 250 inch pounds torque) and motor drive capabilities (FIG. 1a) After a predetermined period of time, stopping the dense fluid centrifuge completely, reverse direction, and begin speed ramp again. This is called the "centrifuge cycle". The centrifuge cycle is operated continuously throughout the remainder of sequence II. The action of the centrifuge cycle produces variable fluid shear in the centrifuge—does not allow the prewash agent or dense fluid within the chamber to reach an equilibrium velocity with the rotating substrates. During cycle A (80a) the centrifuge oscillates in a bi-directional rotation at a preset ramp rate between a maximum and minimum rotational speed and acceleration rate. This sequence continues throughout the rest of the sequence. Alternatively, tumble and barrel cycles can be set at this point for subsequent and optional gimbal operations (FIGS. 2b and 2c).

If the gimbal device (56) shown in FIG. 2a is used, the centrifuge drum (26) may be oriented to any angle from vertical to horizontal to allow for barrel finishing and tumble finishing. Separate barrel-fuge and tumble-fuge cycles can be selected at this point, but are optional. Barrel-fuge and tumble-fuge cycle operations have similar oscillation changes but always have a much lower and constant (no ramping) rotational velocity of between about 1 and about 20 rpm. Prior to rotating from a vertical (centrifuge) to barrel (about 45 degrees) or tumble (about 90 degrees) orientation, the centrifuge automatically changes to the predetermined barrel-fuge or tumble-fuge cycle settings.

Cycle B is a "Pretreatment and Equalization Cycle".

Step 3 is an optional step which may occur prior to vapor equalization, during which waste is recovered. The inclusion of this step in the process is dependant on the nature of substrate being cleaned. During this step excess oils and solid contaminants (if present) are wrung from the substrates located within the centrifuge drum (26) and transferred under centripetal force into the separation zone (36). A liquid transfer valve (88) is opened and a waste evacuation pump (90) is turned on to transfer separated contaminants from the dense fluid centrifuge module (60) through drain ports (B or D, depending upon orientation of centrifuge) through filter element (92) via liquid transfer pipe (94) through opened waste transfer valve (96) to the waste management module (76).

Step 4 is another optional step. During this step a prewash may be accomplished by using one or more of the following processes (a) Centrifuge Spray Cleaning, (b) Spray-Under-Immersion and (c) Multiphase Froth Flotation with Liquid-Gas, Liquid-Liquid or Liquid-SCF Multiphase Extraction.

Generally, to begin, a prewash agent from a pretreatment agent management module (74) at a predetermined temperature of between about 20 and about 150 C. is transferred by opening a liquid transfer valve (100), using a liquid transfer pump (102), and liquid transfer pipe (104) into fill port (A) and delivered via the multi-ported spray manifold (38) to the substrates contained in the centrifuge drum (26). The substrates are then effectively centrifugally spray washed, scoured and thoroughly coated with prewash agent during the entire filling operation (spray wash/wring operation) with loosened and separated contaminants transferred under centripetal force from the centrifugal cleaning zone (32) to the separation zone (36).

More particularly, a Centrifuge Spray Cleaning Operation may be used during which the pressure vessel (2) and perforated centrifuge drum (26) within are filled partially as determined by the low level optical sensor (42), whereupon a recirculation pump (106) with filter element (108) continuously sprays filtered prewash agent over centrifuged substrates via multi-ported spray manifold (38). This is performed by opening liquid transfer valve (110) and pumping filtered prewash agent from drain port (D or B depending upon centrifuge orientation) through recirculation pipe (112) into fill port (A) and through the multi-ported spray manifold (38) and the liquid transfer valve (100) is closed and the transfer pump (102) from the Pretreatment Agent Management Module (74) is turned off.

Or a Centrifugal Spray-under-Immersion Cleaning Operation may be used during which the pressure vessel (2) and perforated centrifuge drum (26) within are filled completely as determined by high level optical sensor (40), whereupon a recirculation pump (106) with filter element (108) continuously sprays-under-immersion filtered prewash agent over centrifuged substrates via internal spray manifold. This is done by opening liquid transfer valve (110) and pumping filtered prewash agent from drain port (D or B depending upon centrifuge orientation) through recirculation pipe (112) into fill port (A) and through multi-ported spray manifold (38). In either case (operation 4a or 4b), and when prewash fill operation is completed and the liquid transfer valve (100) is closed and the transfer pump (102) from the Pretreatment Agent Management Module (74) is turned off.

Or a Centrifugal Froth Flotation and Multiphase Cleaning Operations may be used to increase pressure (fluidize) within dense fluid centrifuge by transferring clean liquid carbon dioxide stored in a storage tank (114) located in the Clean Liquid $CO_2$ Storage Module (70) via the liquid transfer pipe (116) located in the Liquid Transfer Module (68) through opened liquid transfer valve (118) and through fill port (A) located in the liquid zone of the Dense Fluid Centrifuge Module (60) and through multi-ported spray manifold (38) to a pressure of between about 650 and about 2000 psi. A liquid booster pump (120) is used to fluidize the chamber to pressures greater than the equilibrium pressure within the Clean $CO_2$ Storage Module (70) pressure (typically >900 psi). Following this, the booster pump (120) is turned off and the transfer valve (118) is closed. Next a vent valve (121) located on vent return pipe (122) is opened which connects the vent port (C) to the $CO_2$ Recovery Module (72). This operation may be used to controllably reduce the pressure (defluidizes) within the dense fluid centrifuge by transferring vapor from the dense fluid centrifuge module (60) to dense fluid recovery tank (124), next the vent valve (121) is closed. The whole process to defluidize may be repeated as required.

At the end of this step, (Step A) the dense fluid centrifuge internal pressure should be returned to near ambient pressure conditions. This may be accomplished by first recovering dense fluid vapor through vent port (A), recovery pipe (122), opened vent valve (121) and into the $CO_2$ recovery tank (124) until pressure is equalized between the two modules. Following this, the vent valve (121) is closed.

This optional step produces several advantageous cleaning actions including co-solvency, emulsion cleaning and centrifugal shear, frothing or foaming, bubble shearing and scouring action and gas-solid flotation mechanisms and may be performed in the barrel-fuge and tumble-fuge operations.

Other advantages to using this optional step depending upon the temperature, as measured by temperature thermocouple (46), of prewash agent and fluidization pressure exerted, as measured by the pressure transducer (44) or other similarly functioning measurement or sensing devices, the dense fluid phase(s) present within the dense fluid centrifuge module (60) using liquid carbon dioxide and prewash agent may be controlled to be a combination of vapor, liquid or supercritical fluid—producing a range of prewash agent-dense fluid physical and chemical combinations. These include Liquid-Gas Extraction, Liquid-Liquid Extraction and Liquid-Supercritical Fluid Extraction.

A non exhaustive list of pre-wash additive include Oxidants such as ozone gas, supercritical ozone, sulfur dioxide gas, sulfur dioxide liquid, sulfur trioxide gas and hydrogen peroxide liquid, or Reducing Agents such as Dimethyldithiocarbamate liquid, or liquid Alcohols and Glycols such as methanol, isopropanol, polyalcohols (some solids may be dissolved in soy methyl esters as additives), polyethylene glycol and Tetrahydrofurfuryl alcohol (THFA), or Esters such as soy methyl esters, or Oils such as napthenic, paraffinic and aromatic oils, or Alkanes such as propane, butane or hydrochlorofluorocarbons, or Alkenes such as propylene carbonate, or Liquefied Gases such as liquid nitrogen, liquid ammonia, sulfur dioxide, butane, propane, sulfur hexafluoride or hydrofluorocarbons. In addition, prewash agents can be complexing agents, chelating agents, surfactants, detergents, dispersants, foaming agents, brighteners, softeners and bactericidal agents and combinations thereof.

Step 5 is another optional step. Following the completion of any one or combination of the options detailed in step 4 the bulk of the prewash agent is removed from the dense fluid centrifuge module (60) and returned to the Pretreatment Agent Management Module (74) via drain port (D or B depending upon orientation of centrifuge) through opened liquid transfer valve (88) with liquid transfer pump (90) turned on and through liquid transfer pipe (94) and through opened valve (126). Valve (88), valve (126) and transfer pump (90) remain on for a time period from 30 seconds to 3 minutes while the centrifuge cycle continues to separate residual prewash agent from pretreated substrates. Following this, valve (88) and valve (126) are closed and pump (90) is turned off.

Step 6 follows the completion of steps 2-5 or any combination thereof, the vapor pressures between Dense Fluid Centrifuge Module (60) and Clean Liquid $CO_2$ Storage Module (70) are equalized through the vapor zones of each system using the vapor transfer bridge (128) located in the Vapor Transfer Module (66). Vent valve (130) located on vent line (122) is opened to the vent port (C) until the pressures between the two modules are approximately equal, determined by comparing a clean tank pressure sensor (132) with the dense fluid centrifuge module through the pressure transducer (44)

Cycle C is the "Phase Shift Extraction Cycle" Wherein Extraction and Recovery of Trace Prewash agents, contaminants, particles or residues and dense fluid from substrates under isobaric and isothermal conditions occurs.

Step 7 is the initial phase change. It is a "solvent phase" during which the vapor bridge, connected to the vent valve (130), is opened. Clean dense fluid (liquid) is transferred from storage tank (114) located in the Clean Liquid $CO_2$ Storage Module (70) via the liquid transfer bridge (116) located in the Vapor Transfer Module (68) through opened liquid transfer valve (118) and through fill port (A) located in the liquid zone of the Dense Fluid Centrifuge Module (60) and through multi-ported spray manifold (38) and to a pressure of between about 650 and about 2000 psi. Displaced dense fluid vapor returns through vent port (C) via vent line (122) through vent valve (130) and into Vapor Transfer Module (66). During this operation, the substrates are being centrifugally scoured and spray washed. A liquid booster pump (120) is used to fluidize the chamber to pressures greater than the equilibrium pressure within the Clean $CO_2$ Storage Module (70) pressure (typically >900 psi.), to perform this, a booster pump (120) is turned on and the valve (118) is closed.

Step 8 is the second phase change. It is a "non-solvent phase" during which contaminated dense fluid is transferred through one of the two drain ports (D or B depending upon centrifuge orientation) from dense fluid centrifuge under isobaric and isothermal conditions (vapor phase exchange) through valve (134) and transfer pipe (136) and into the liquid zone of the recovery tank (124) while vapor from the clean storage tank (114) replaces evacuated contaminated dense fluid liquid within cleaning vessel under constant temperature and pressure through valve (130) and transfer pipe (122) and through vent port (C). Alternatively, dirty dense may be returned back to the clean tank (114) if not grossly contaminated or if it contains special additives using liquid transfer pump (106) through transfer line (138) through transfer valve (140) and into clean storage tank (114). During this process, the liquid phase is receding within the dense fluid centrifuge causing the liquid-phase (high density) dense fluid containing contaminants to be wrung out of internal cavities as the vapor phase (lower density) dense fluid increases in volume—flushing particles and oily contaminants from internal cavities. Using isobaric transfer greatly limits temperature drop during liquid carbon dioxide phase exchange, typical of conventional processes.

Step 9 is a cleaning operation which may take one or more of three forms (a) Centrifugal Spray, (b) Centrifugal Spray-under-Immersion and (c) Centrifugal Froth Flotation. Additionally, the cleaning operation(s) may occur during a variety of orientations of the centrifuge drum (26) via the gimbal device (FIGS. 2a–2c) to tumble and/or barrel orientations and all orientations in-between.

A Centrifugal Spray operation may be used during which the pressure vessel (2) and perforated centrifuge drum (26) within are filled partially as determined by the low level optical sensor (42), whereupon an optional recirculation pump (106) with filter element (108) continuously sprays filtered liquid carbon dioxide over centrifuged substrates via multi-ported spray manifold (38). This is done by opening liquid transfer valve (110) and pumping liquid carbon dioxide obtained from drain port (D or B depending upon centrifuge orientation) through recirculation pipe (112) into fill port (A) and through the multi-ported spray manifold (38).

Or a Centrifugal Spray-under-Immersion Cleaning Operation may be used during which the pressure vessel (2) and perforated centrifuge drum (26) within are filled completely as determined by high level optical sensor (40), whereupon optional recirculation pump (106) with filter element (108) continuously sprays-under-immersion filtered liquid carbon dioxide over centrifuged substrates via internal spray manifold. This is done by opening liquid transfer valve (106) and pumping filtered liquid carbon dioxide obtained from drain port (D or B depending upon centrifuge orientation) through recirculation pipe (112) into fill port (A) and through the multi-ported spray manifold (38).

Or Centrifugal Froth Flotation Cleaning Operation may be used. The pressure within the Dense Fluid Centrifuge Module (60) is increased pressure to between about 650 and about 2000 psi by transferring clean liquid carbon dioxide stored in a storage tank (114) located in the Clean Liquid $CO_2$ Storage Module (70) via the liquid transfer bridge located in the Vapor Transfer Module (68) through opened liquid transfer valve (118) and through fill port (A) located in the liquid zone of the Dense Fluid Centrifuge Module (60) and through the multi-ported spray manifold (38). A liquid booster pump (120) is used to fluidize the chamber to pressures greater than the equilibrium pressure within the Clean $CO_2$ Storage Module (70) (typically >900 psi). Following this, the booster pump (120) is turned off and the transfer valve (118) is closed. Following this, vent valve (121) located on vent return pipe (122) is opened which connects the vent port (C) to the $CO_2$ Recovery Module (72). This operation reduces the pressure (defluidizes) within the dense fluid centrifuge by transferring back vapor to dense fluid recovery tank (124). Following this, the vent valve (50) is closed. If required, the dense fluid centrifuge may be re-fluidized to the predetermined fluidization pressure and defluidized repeatedly as described above.

At the end of this operation, equalize dense fluid centrifuge internal pressure with clean tank storage tank pressure by opening vapor transfer valve (130) connected to vent port (C) with vapor transfer pipe (122) and through vapor transfer bridge (128) into the vapor zone of a clean storage tank (114).

Finally, the centrifugal phase shift process can be using the gimbal device (56) (FIGS. 2a–c) to the barrel orientation and/or to the tumble orientation and back to the vertical orientation, with the centrifuge cycle altered to a predetermined tumble-fuge or barrel-fuge cycle, respectively. Dense fluid will separate from substrates during rotation into saturated vapor phase at top of rotation and saturated liquid phase at bottom of rotation.

The Phase Shift Extraction Cycle concludes following the last isothermal-isobaric transfer from dense fluid centrifuge into either the clean tank or recovery tank—with only dense fluid vapor phase present within dense fluid centrifuge.

Steps 8 and 9 my be repeated sequentially as required to produce "solvent" and "non-solvent" phase conditions sequentially and instantly under isothermal and isobaric conditions while the substrates are continuously operating under the centrifugal cycle producing vigorous scouring, void filling and draining, frothing and variable solvency. Cycle D is the "Dense Fluid Recovery Cycle".

Step 10, represents the recovery of the residual dense fluid vapor contained within dense fluid centrifuge. Residual dense fluid is recovered through vent port (C), vapor transfer pipe (122), opened vapor transfer valve (130) through vapor transfer bridge (142) through vapor aerosol condenser (144) and using a gas booster pump (146), whereupon the vapor is compressed and condensed using a heat exchanger (148), is transferred into the clean storage tank (114). The dense fluid recovery operation is typically performed until internal dense fluid centrifuge pressure is lowered to about 300 psi as measured by pressure transducer (44).

Step 11 is an optional step. Should heating and ionization of the substrates be necessary whether because the optional dense fluid froth flotation cycles are performed or the substrates must be outgassed to remove residual vapor and electrostatic charges. Hot ionized gas is produced under pressure by heating and ionizing a gas from an external source (i.e., air) or vapor from the clean $CO_2$ liquid storage tank (114), if $CO_2$ vapor is used, it is recycled into the vapor recovery module. Using clean dry air, air is fed through a vapor transfer valve (150), using a heater-ionizer unit (152) and through transfer pipe (116) and into fill port (A) and through internal spray manifold (38) during which the dense fluid centrifuge cleaning vessel is continuously vented to the atmosphere through vent port (C) and through either vent valve (154) via vent pipe (156) and into the atmosphere or, if $CO_2$ is used, through vent valve (120) and into vapor zone of contaminated dense fluid storage tank (124). Centrifugal hot ionized gas spraying continues until the internal temperature is greater than 20 C. The heated ionization cycle may also be performed using an internal infrared heating-ionization element (not shown) which traverses the vertical axis of the internal spray manifold (38)—which uniformly exposes substrates to said internal heating-ionization element using the centrifuge with or without a negative pressure to expose all of the substrates. A combination of negative pressure with the infrared heater-ionization embodiment heats and neutralizes charges contained on the substrates more quickly. Following this operation, the heater-ionizer unit (152) is turned off.

Step 12 is when the lowering of the residual gas pressure, within the dense fluid centrifuge, to ambient pressure conditions by leaving vent valve (154) open until internal pressure is less than about 20 psi as measured by pressure transducer (44).

Step 13 is an optional step. Following the release of residual pressure, the dense fluid centrifuge may be placed under vacuum conditions with internal infrared heating to outgas and residual and trace vaporous contaminants.

Step 14 marks is the end of the "Dense Fluid Recovery Cycle" is stopped the centrifuge activity ceases and the motor is slowed to zero rotational velocity.

Sequence III is the Unload Sequence which has one step. Step 15 is when the centrifuge lid (4) is unlocked using hydraulic unlock and opened and the clean and finished, heated and ionized, substrates within the centrifuge drum (26) are removed. The system is now ready for another dense fluid cleaning and finishing process.

Sequence IV is the Dense Fluid Management Sequence. This sequence occurs in parallel and in combination with Sequences I–III.

Step 16 is when the vapor transfer and equalization operations occur. Contaminated dense fluid contained in the recovery tank (124) is continuously separated by distillation into two phases: a saturated vapor phase comprising carbon dioxide and a liquid phase comprising prewash agent(s), carbon dioxide additive(s) and contaminant(s). Heat required for constant pressure and temperature distillation is supplied preferably withdrawn from the clean storage tank (114) using a heat pump (158). The saturated vapor phase contained in the vapor zone of the recovery tank (124) is transferred through the vapor transfer bridge (142) using a gas pump (146) and through an aerosol vapor separator (144) and through a heat exchanger (148) and into the temperature-controlled clean storage tank (114). A combination of vapor transfer pump (146) and heat pump (158) maintain the pressure and temperature within the clean storage tank under vapor-liquid equilibrium conditions from about −40 to about 70 F. and about 650 to about 850 psi, respectively. A vapor transfer bridge (142) maintains vapor pressure equilibrium between clean storage tank and recovery tank to prevent supersaturation (non-equilibrium) conditions. Aerosol contaminants scrubbed from the vapor using a high pressure aerosol separator (144) are returned to recovery tank liquid zone via aerosol transfer pipe (160).

Step 17 is an optional step. If prewash step 17 occurs this step allows for the recovery of prewash agent and contaminants. During this step, the liquid phase constituents separated and concentrated within the liquid zone of the recovery tank (124) are periodically transferred, under pressure, to the Pretreatment Agent Management Module (74) via a transfer pipe (162) and through an opened transfer valve (164) as required for treatment, reuse or disposal under the vapor pressure supplied in recovery tank (blowdown recovery operation). Following this operation, prewash agent valve (164) is closed. The mixture of carbon dioxide gas and optionally heated prewash agent stored in the prewash agent storage tank (198) may be maintained under carbon dioxide gas pressure for subsequent operations within the dense fluid centrifuge module (60). A closed-loop filtration system (200) is used to maintain the quality of the prewash agent. An optional vacuum distillation system (202) may be used to further purify the prewash agent. Prewash agent makeup is provided through valve (204) and wasting or controlled drag-out of prewash agent is provided via valve (206). Collected wastes in the form of spent or residual prewash agents and contaminants stored within the waste storage tank (98) are transferred to a suitable waste facility via valve (208).

Step 18, is the Carbon Dioxide ($CO_2$) Supply Recharge procedure. To re-supply $CO_2$ vapor lost during venting and blowdown operations are performed periodically using an external source of liquid carbon dioxide (not shown) transferred via a transfer pipe (166), opened valve (168) and transfer pump (170) into the liquid zone of the clean storage tank (114).

Step 19, is the Fluids Management procedure. During this step the high level optical sensors (178 and 172) and low level optical sensors (176 and 174) located in the lower and upper halves the clean storage and recovery tanks, respectively, as well as pressure sensors (132 and 180) and temperature sensors (184 and 182) are used with a PLC or PC and software to monitor and control distillation, liquids concentration, vapor recovery and carbon dioxide recharge operations in the dense fluid management systems as well as insure adequate availability of saturated dense fluid and maintenance of vapor-liquid equilibrium conditions for dense fluid phase shifting, fluidization, flotation and prewashing cycles herein.

Step 20, is an optional step for injecting additives into the clean dense fluid or for recharging the clean dense fluid with additives. If additives are injected into the clean dense fluid storage tank using the optional additive injection system (FIG. 3), using opened valve (186), injection pump (188) and in-line mixer (190) or if the clean dense fluid is used and returned several times during phase shift cycles described above for lightly contaminated loads, the clean storage tank contents must be periodically cleaned and recharged (with additives if required). This is accomplished as follows: Clean storage tank dense fluid is transferred on a batch basis through the liquid transfer bridge (116) into the recovery tank (124) through opened valve (192), whereupon operations 16 through 19 above are performed. This may be performed during non-production periods in two (2) or three (3) large volume transfers or during production operations in multiple small volume transfer operations. This process maintains the "quality" desired for the cleaning storage tank dense fluid in terms of cleanliness or additive concentration.

Step 21 is an optional step and dependant on the cleaning parameters and the nature of substrate being If the quality requirement for the clean storage tank dense fluid is very stringent (contaminant levels <<1 ppm (>99% purity)), for example as with wafer cleaning applications (FIG. 10), an add-in treatment unit for the vapor phase is provided. The present invention provides both single stage distillation (sequence steps 16-17 above) for general industrial quality cleaning solvent (99% pure), multiple-distillation treatment capability (step 20 above) and an enhanced vapor treatment process for producing "ultrapure" dense fluid as follows:

Vapor may be transferred from recovery tank through vapor transfer bridge (142), using a vapor transfer pump (146) and into an optional vapor treatment unit (194) which contains a device to preheat the vapor to a temperature of approximately 200 C., contacted with a catalytic bed and transferred through a regenerative metal oxide dryer. Following this, the ultrapure vapor is transferred through a heat exchanger (148) and compressed as a saturated ultraclean liquid in clean storage tank (114). In these applications, special attention is observed with respect to the quality of construction materials for the dense fluid centrifuge and integrated fluid management system specifically, non-reactive materials should be used to avoid interaction with the cleaning. Materials such as stainless steel, PEEK, fluorocarbons, and nylon.

Sequence V is also the "Automation and Control of Dense Fluid Cleaning and Fluids Management System". The dense fluid cleaning and dense fluid management apparatus and processes are preferably automated and electronically controlled using software, process logic controller (PLC) or a personal computer (PC), pressure sensors or switches, temperature sensors or switches, position sensors, vibration sensors (out-of-round centrifuge conditions) and optical level sensors, among other electronic devices. Electronic control devices which efficiently perform the phase shifting, centrifugation, recycling and recovery processes of the present invention six vapor zone and liquid zone optical liquid level sensors (40, 42, 176, 178, 172, 174) which provide an electrooptical "go" and a "no-go" indicator of saturated $CO_2$ vapor and liquid phase levels present within the upper and lower halves of the three high pressure vessel of the dense fluid centrifuge module (60), clean storage tank (114) and within the vapor recovery tank (124). Pressure transducers/sensors (44, 132, 180) and temperature thermocouple/sensors (46, 182, 184) located in all three pressure vessels described above ensure reliable vapor-liquid equilibrium control between systems.

An overview and application of the within process is shown cleaning a substrate which is a contaminated machined ball point pen tip (300) in FIG. 5. The contaminated substrate contains a deep narrow void wherein at the bottom is a small (1 mm diameter) stainless steel ball (310) which is swaged into the tip. This substrate body is machined from solid brass or stainless steel rod stock using precision Swiss screw machine technology employing tiny drills and swaging devices and cutting fluids. Substrates produced with this machining technology are soaked in oil and laden with metallic fines and chips (contaminants) (320) within the voids and cavities and the surface is coated with thin films of waxes (not shown) and extreme pressure agents (machining oil additives). Moreover, because of their small size (about 3 mm diameter by about 25 mm length), virtually millions of ball point tips will pack a centrifuge drum having a 12×12 inch diameter. Cleaning with the within method and apparatus has removed nearly 250 milliliters of oils, wax and chips in such a mass of pen tips.

This ball point tip (300) application presents several problems that require innovative device and process adaptations not found in conventional dense fluid cleaning technology. Unlike conventional dense fluid cleaning technology, the present invention addresses the above problems by providing five unique features. The ability to separate excess contaminants from heavy and densely packed loads excess contaminants prior to cleaning. The ability to provide a prewash step to emulsify wax films and remove metal chips (>100 microns) trapped in voids. The ability to precision clean the heavy and dense mass of parts to remove trace oils and small metal particles (<100 microns) trapped in deep voids and narrow interstitial spaces (i.e., ball-body interface). The ability to perform the previous operations without causing the substrates to rust or corrode. Finally, the ability to have the parts clean and dry (warm) following processing. One additional feature is to also prepare metallic ball point tips, subject to oxidation, for extended shelf-life. This is accomplished by using a rust inhibitor in the optional prewash step which binds to the active metal sites of the metallic parts (complex formation) and is not subsequently appreciably removed in the extraction step.

The Centrifugal Froth Flotation Process is also illustrated in FIG. 5 with respect to the ball pen tip (300). First voids filled with contaminants, prewash agent or dense fluid are pressurized (400) with dense fluid until it gas saturation or super-saturation conditions are created within cavities, voids and interstitial spaces of the pen tip, contaminants, prewash agent(s) and dense fluid, during which the substrate is subjected to a continuous bi-directional centripetal force. Next the pressure is reduced which causes millions of microscopic scrubbing and scouring carbon dioxide vapor bubbles (410) to form in the cavities, voids and interstitial spaces therein forming a foam or froth (420)—gas-liquid interfaces. Finally, the froth under the influence of centripetal force creates various cleaning actions—shear, cavitation and flotation causes the contaminants (320) to separate from internal cavities, voids and interstitial spaces whereupon centripetal shear further separates contaminants from substrate and transfers them to the separation zone of the dense fluid centrifuge (FIG. 1c).

FIG. 6a is a chart showing the dense fluid and gives physicochemical data that includes critical point, triple point, solubility, density and viscosity data. The phase-shift process described herein uniquely contributes both "chemical" and "physical" cleaning and separation energies. The entire process is performed under the constant physical influence of a centripetal force. Therefore changes in physical state of the dense fluid can used to rapidly separate trapped or entrained contaminants dissolved or dispersed in solution or captured in gas-liquid or gas-solid interfaces. Exchanging the two phases present at the vapor-liquid equilibrium boundary under isothermal and isobaric change accomplishes this.

The centrifugal phase shifting pressure-temperature range is from about 50 to about 70 atm and about 10 to about 80 C., respectively. The apparatus and procedures to perform this exchange have been previously described in detail above. Under equilibrium conditions, the vapor phase exhibits under the same temperature and pressure a much lower density than the liquid phase.

Fluidization is illustrated in FIG. 6b and defludization is illustrated in FIG. 6c, at about 60 atm and about 20 C., the instant the saturated liquid phase is present in the substrate being acted upon by a centripetal force several cleaning actions can be observed including fluid shear, vortexing and solvency because the density as risen more than 8-fold, whereupon the very instant that the saturated liquid phase is withdrawn from the dense fluid centrifuge, replaced by saturated vapor, the voids are evacuated of saturated liquid phase which expels entrained, dissolved or otherwise captured contaminants from cavities, voids and interstitial spaces producing a non-solvent state the density has decreased by more than 8-fold.

The exchange process, whether fluidizing or defluidizing, creates significant frothing, vortexing and shearing action at the receding or rising phase boundary within the dense fluid centrifuge cavity. The present invention produces a much more rapid phase shifting process that occurs at constant temperature and pressure performed along the liquid-vapor phase boundary. This process produces a 2-phase "solvent spectrum" that is altered between "solvent phase" (solubility parameter—22 $Mpa^{1/2}$) and "non-solvent phase" (solubility parameter—<10 $Pa^{1/2}$), respectively.

Figure 7:
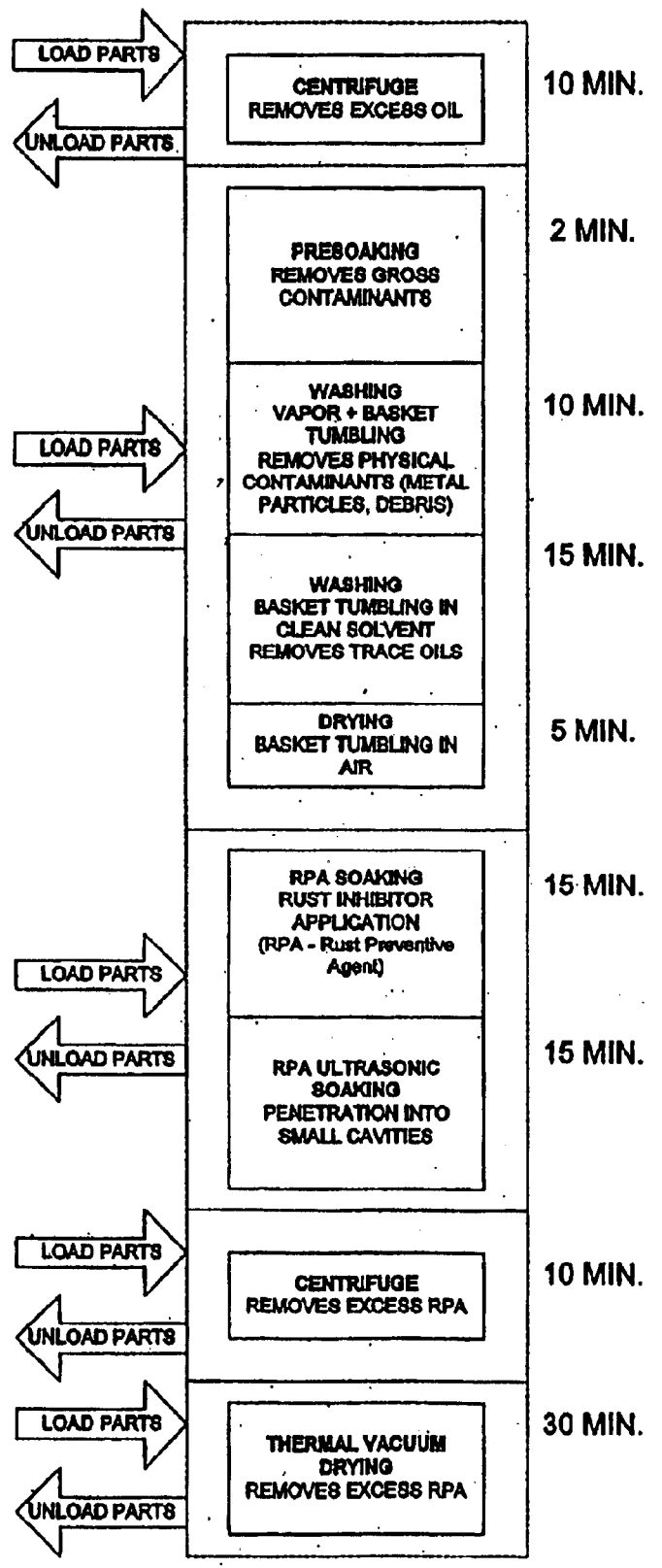
FIG. 7 is a flow diagram of a conventional cleaning and finishing process.
Figure 8:
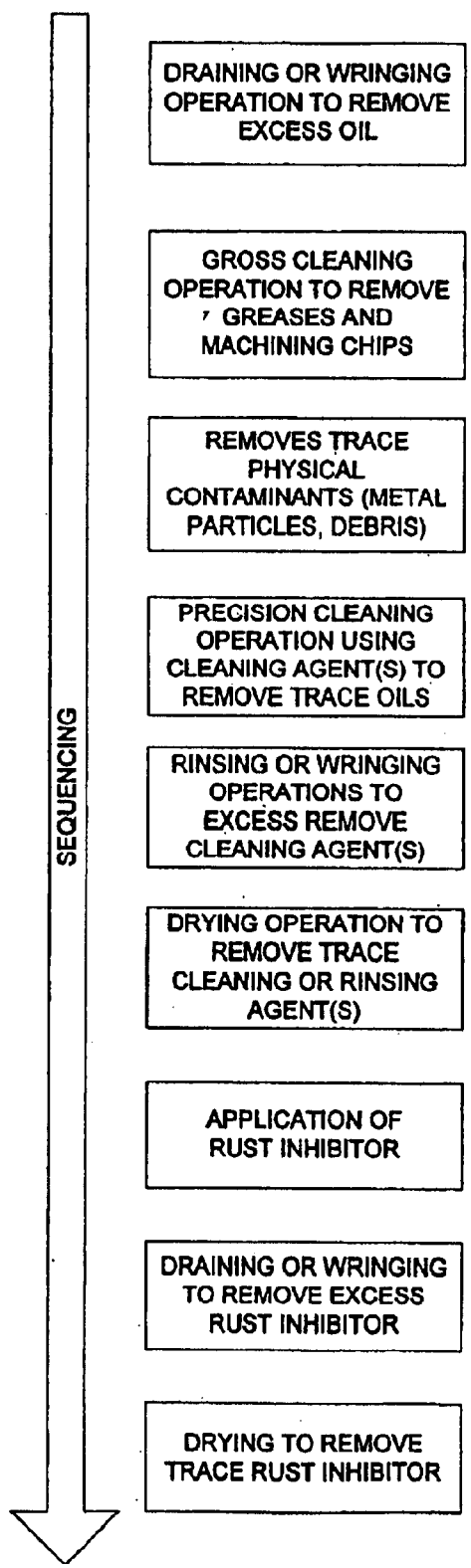
FIG. 8 is a flow diagram of conventional product cleaning requirements.
Figure 9:
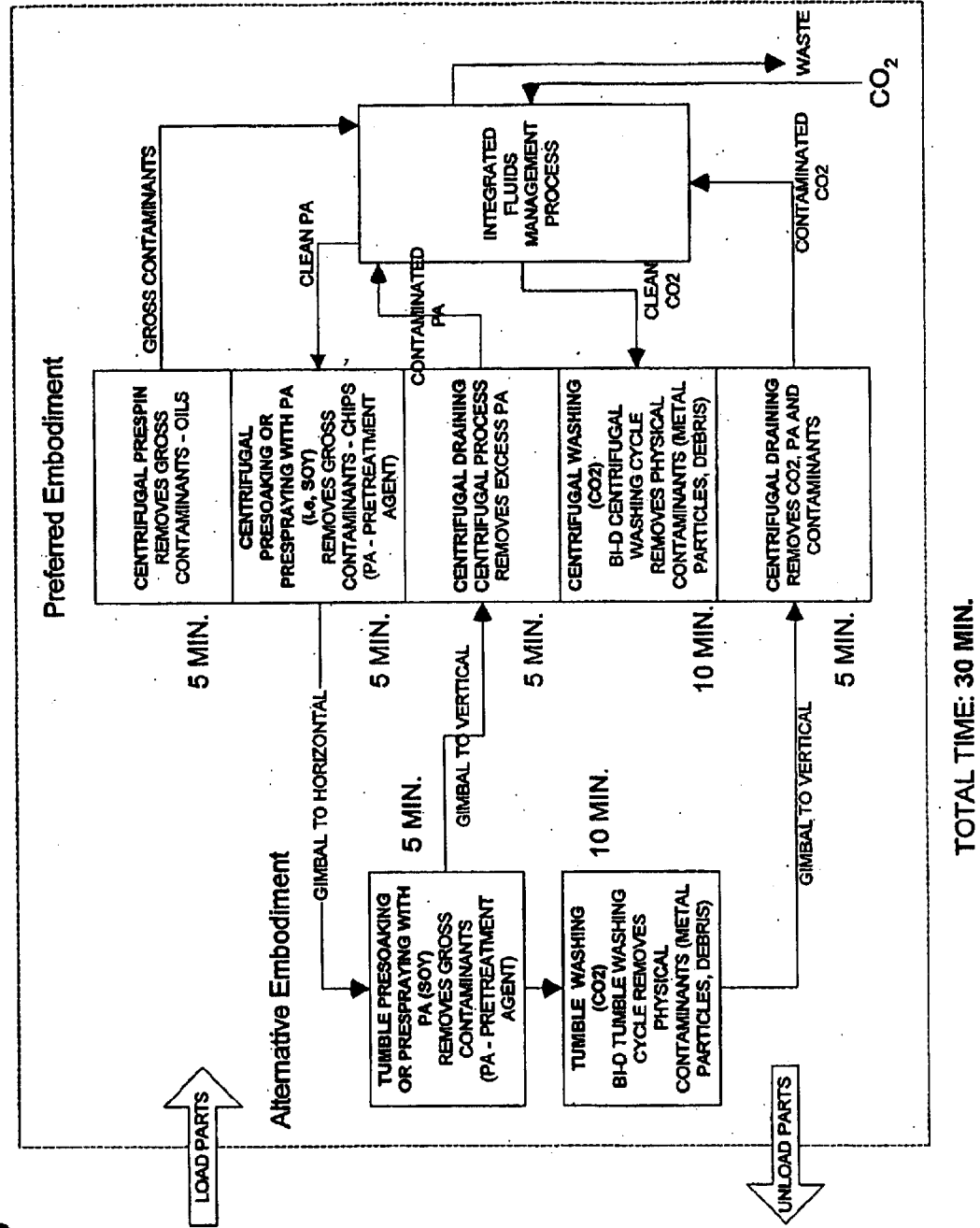
FIG. 9 is a flow diagram of the centrifugal dense fluid liquid-liquid cleaning process.

FIG. 7 provides a diagram of a conventional cleaning line for a substrate such as the ball point pen tips (300). The conventional cleaning line requires up to five (5) separate machines, five (5) independent substrate load and unload steps and a process time of over 100 minutes. FIG. 8 provides a diagram of a conventional cleaning process for a substrate such as the ball point (300). The conventional cleaning process for the substrate requires up to nine (9) independent cleaning and finishing operations which cannot be combined because of solvent and equipment operational and process incompatibilities that cannot be resolved with conventional cleaning technology. The within apparatus and process invention (FIG. 9) can reduce the cleaning requirement for the substrate to one (1) machine, one (1) load and unload step, (1) cleaning process and a reduced processing time.

Figure 10:
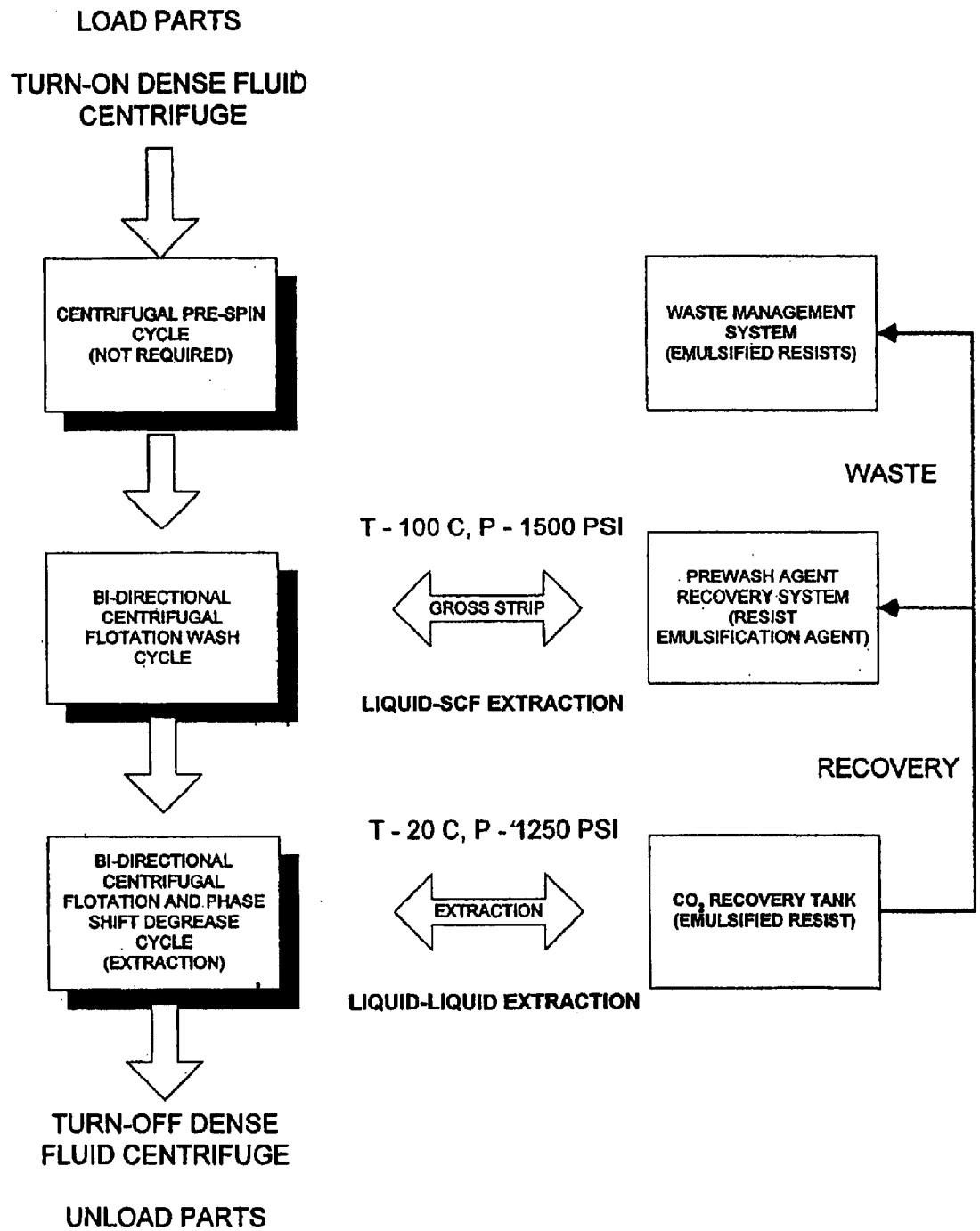
FIG. 10 is a flow chart of a liquid-supercritical fluid cleaning a wafer coated with photoresist.
Figure 11A:
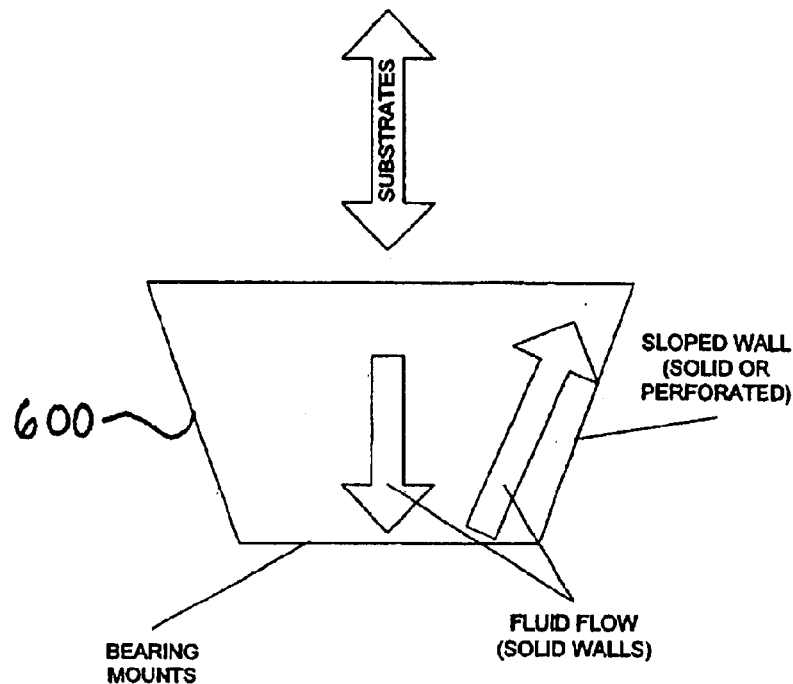
FIG. 11a is a first alternate embodiment of the dense fluid centrifuge drum.
Figure 11B:
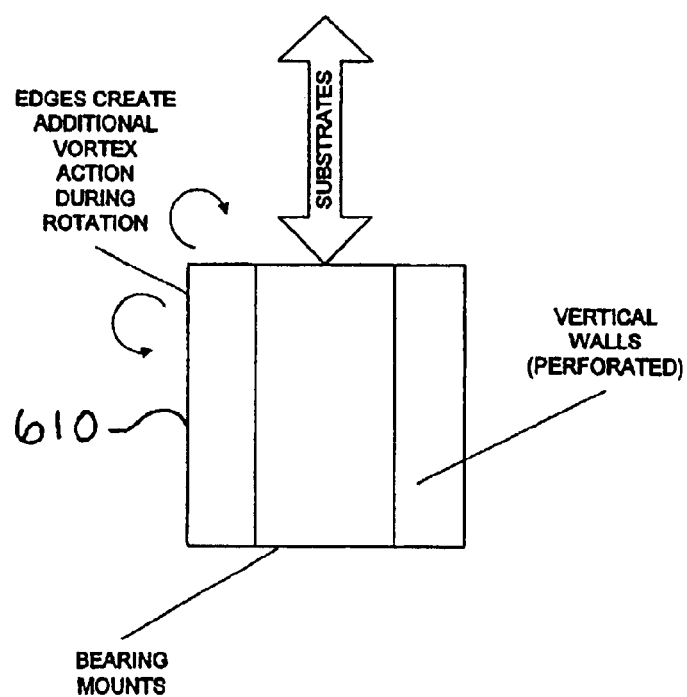
FIG. 11b is a second alternate embodiment of the dense fluid centrifuge drum.
Figure 11C:
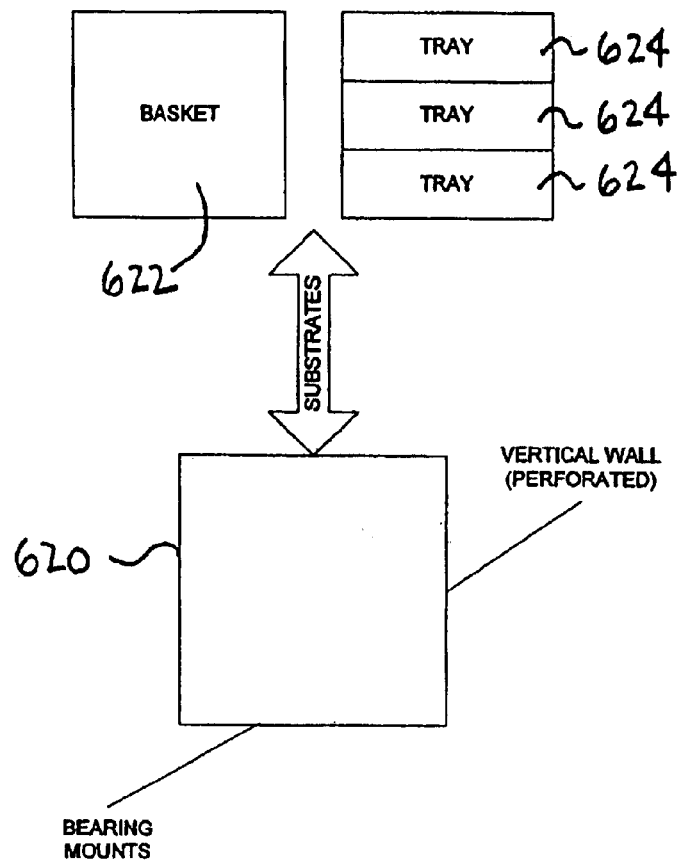
FIG. 11c is a third alternate embodiment of the dense fluid centrifuge drum.
Figure 11D:
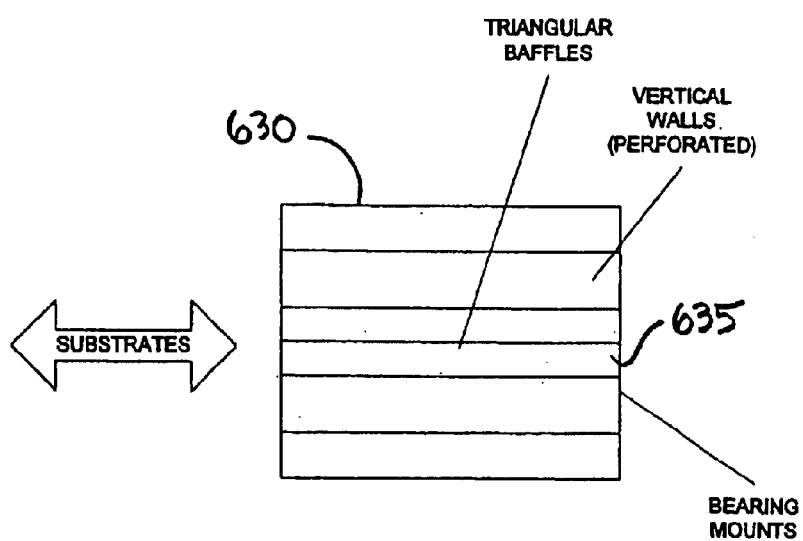
FIG. 11d is a fourth alternate embodiment of the dense fluid centrifuge drum.
Figure 11E:
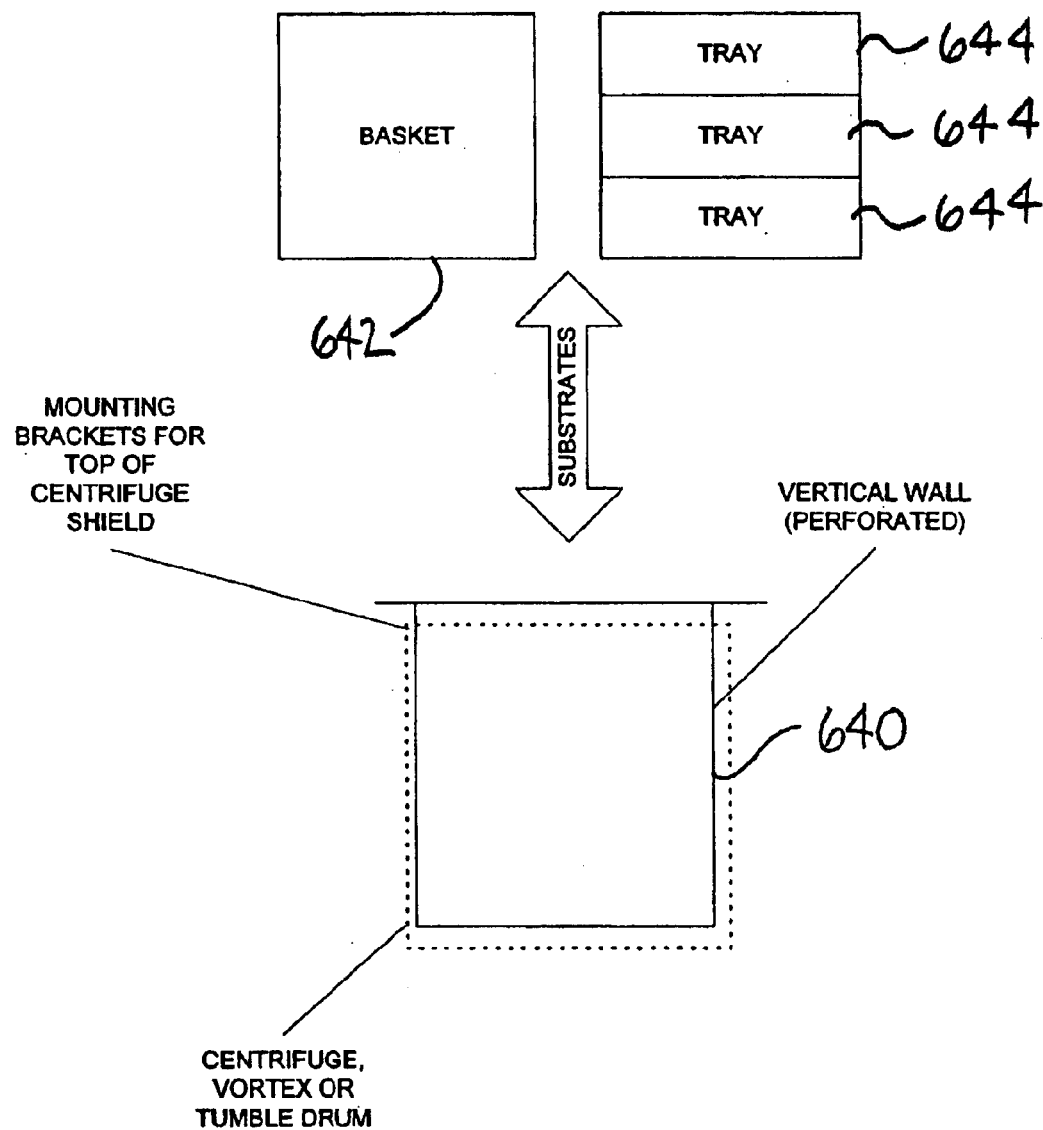
FIG. 11e is a fifth alternate embodiment of the dense fluid centrifuge drum.

Shown in FIG. 10 is a flow chart of a cleaning process for a wafer coated with photoresist (a hard polymer coating). For this wafer substrate a prewash agent, a soy methyl ester with other additives including amines and operating at a temperature of about 100 C. is sued. The resulting prewash process is a liquid-supercritical fluid extraction and the fluidization pressure and temperature (imparted by prewash agent) is greater than the critical parameters for carbon dioxide. Following emulsification of the polymeric coating, the wafers may be extracted with liquid carbon dioxide.

The examples of uses of this invention and the substrates listed within are not intended to provide an exhaustive list. The process and apparatus herein, may be useful for dry cleaning textiles, removing oily wastes from shop rags, treating hazardous waste, removing oil from spent oil filters, cleaning tube bundles or elongated substrates, removing organic coatings—removing mold varnish and stripping.

Shown in FIGS. 11a–11e are a variety of centrifuge drum (26) alternate embodiments. A barreling drum (600) is a conical-shaped drum having an opening that has a larger diameter than its base and which attaches to the centrifuge bearing via the load springs (28) (FIG. 1a). The barreling drum (600) may have perforated walls in which case dense fluid flow is directed in a straight line from center point to the circumference of the centrifuge cavity (vertical operation only). Alternatively the drum may have solid walls whereby the dense fluid flow is in a semicircle, flowing downward through the center point and upward along the walls of the drum. This design in useful for processing substrates which may be "poured" from the dense fluid centrifuge following processing. This design is a fill and pour design without using drum separate drum inserts such as baskets and trays.

A vortexing drum (610) is a polygonal-shaped drum having a constant diameter and which attaches to the centrifuge bearing via the load springs (28) (FIG. 1a). The vortexing drum (610) has perforated walls and has various geometric and concentric shapes. Fluid flow is highly turbulent due to the vortexing created by the irregular shape rotating at high velocity and is directed in a straight line from center point to the circumference of the centrifuge cavity. This design can accept a similarly shaped basket or tray filled with substrates.

Figure 12A:
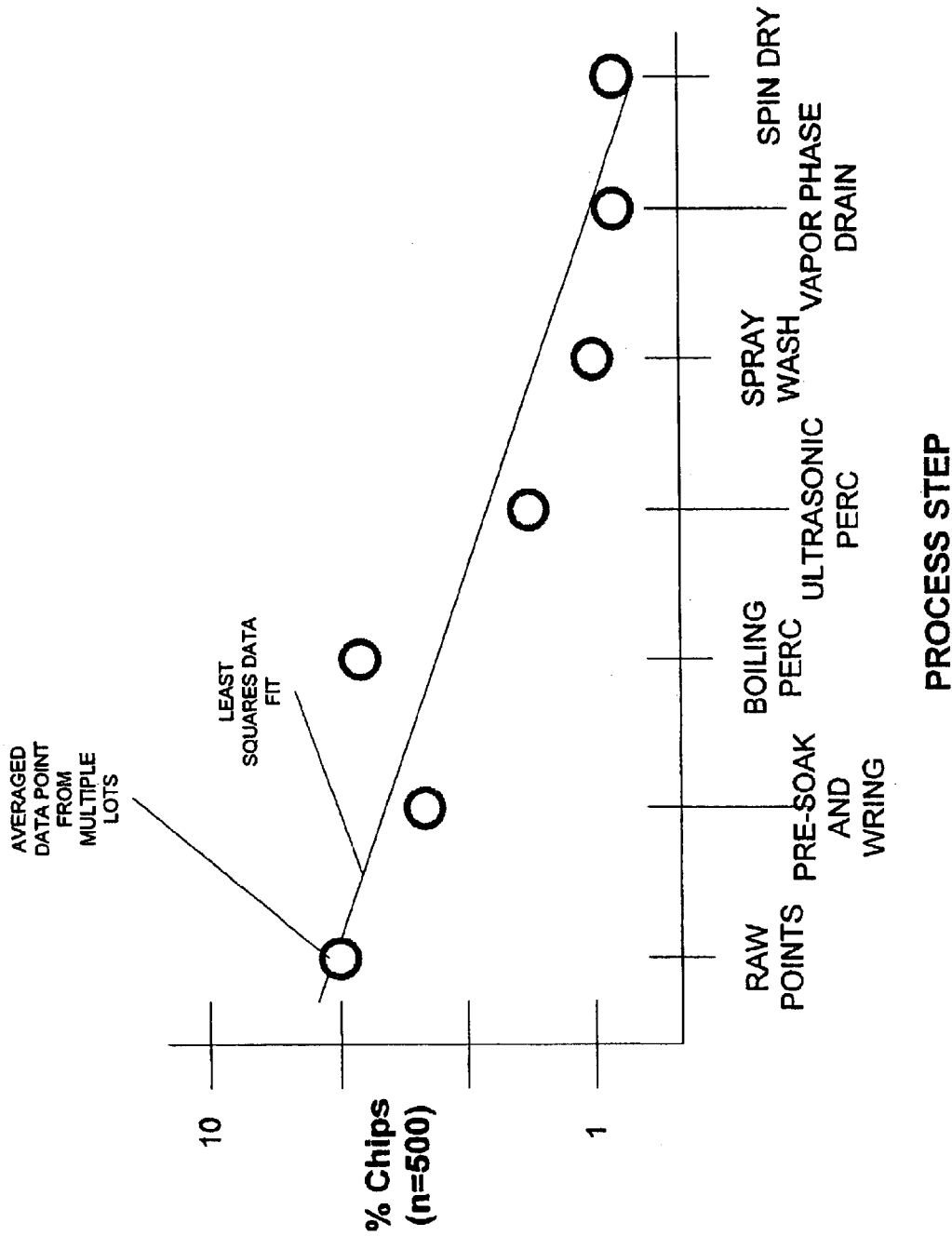
FIGS. 12a-b are graphs of performance data comparing conventional solvent cleaning and conventional dense fluid cleaning with centrifugal phase shift and froth cleaning.

A cylindrical centrifuge drum (620) is a drum having a constant diameter and which attaches to the centrifuge bearing via the load springs (28) (FIG. 1a). The cylindrical centrifuge drum (620) has perforated walls. Fluid flow is turbulent due to substrate-dense fluid interactions only and is directed in a straight line from center point to the circumference of the centrifuge cavity. In this design, substrates fill the entire drum cavity or, more efficiently, can accept a similarly shaped and sized basket (622) or several trays (624) filled with substrates. Alternatively and as shown in FIG. 12c, the centrifuge may be compartmentalized about the center point (shown) or in horizontal segmented layers such as using several stacked trays. Substrates fill individual compartments in relatively equal weight distribution that maintains balance during horizontal centrifugal processes about the central axis.

A tumble drum (630) is a cylindrical-shaped drum having a constant diameter and which attaches to the centrifuge bearing via the load springs (28) (FIG. 1a). The tumble drum (630) has perforated walls and has triangularly-shaped baffles (635) affixed to the interior drum walls in a concentric manner. This design will thoroughly mix and blend substrates during extraction processes and is useful for cleaning textiles and granulated substrates subject to nesting or agglomerating. This design is for manual load and unload operations and may use a sliding inverter drum.

An Inverter Drum (640) is a cylindrical-shaped drum having a constant diameter and which attaches to the attaches to the centrifuge bearing via the load springs (28) (FIG. 1a). The inverter Drum (640) design will insert substrates into the center of a secondary centrifuge, tumble, vortex drum which then allows the substrates to be processed under turbulent mixing conditions. The substrates do not experience a centripetal force. This design is for manual load and unload operations and may be a basket (642) or a sliding tray (644) design.

Figure 12B:
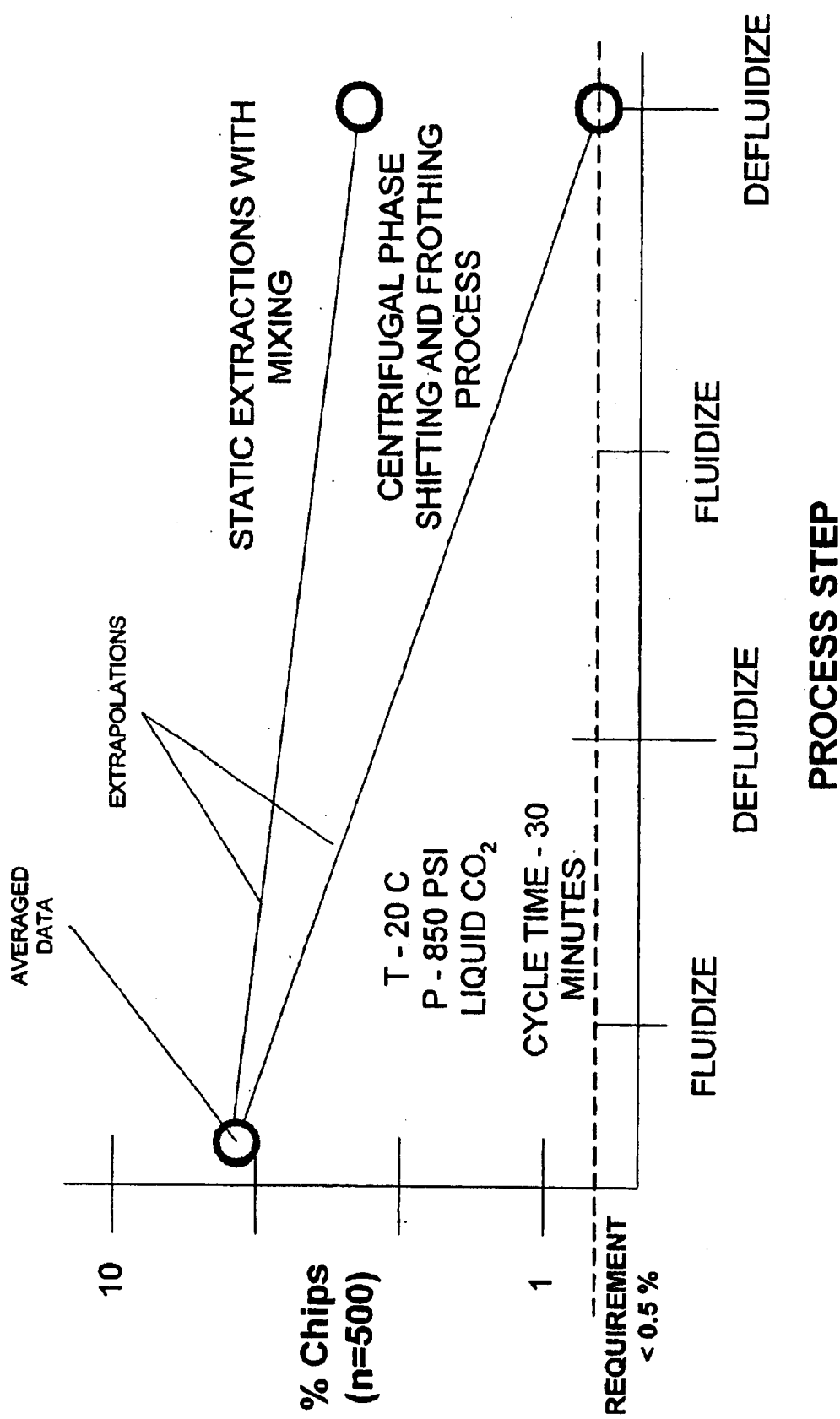

Tests were conducted to determine how the new centrifugal phase shifting process performed in comparison to (1) standard dense fluid extractions with flow-through and fluidization operations and (2) conventional ultrasonic perchloroethylene cleaning (boiling). These results are shown graphically in FIGS. 12a and 12b. The results show that the present process produces cleaning and separation phenomenon, and equivalent cleaning results, analogous to those found in multi-stepped solvent cleaning processes in less time.

What is claimed is:

1. A dense fluid centrifuge assembly for cleaning a substrate with a dense fluid comprising:
    a high pressure vessel having an upper region and a lower region receiving a centrifuge drum having a central axis;
    a drive shaft for rotating said drum about said central axis;
    said drum having a bottom wall supported by one or more bearings and a perforated side wall;
    a porous centrifuge shield circumscribing the centrifuge drum and forming a separation compartment bounded by said porous shield and said pressure vessel;
    a stationary, porous centrifuge shield circumscribing the centrifuge drum and forming a separation compartment bounded by said porous shield and said pressure vessel, said shield adapted to protect an inner surface of said high pressure vessel from potential impact by the rotating drum and/or contents contained therein;
    a drain port located in said high-pressure vessel;
    a fill port located in said high-pressure vessel; and,
    a high optical sensor located in said upper region of said high pressure vessel and a low optical sensor located in said lower region of said high pressure vessel for monitoring the fluid levels within the pressure vessel.

2. The assembly of claim 1 further comprising an external dense fluid cleaning and management system including at least one module for controlling a phase change of said dense fluid within said centrifuge assembly.

3. The assembly of claim 2 wherein a first of said at least one module is a dense fluid vapor transfer module.

4. The assembly of claim 3 wherein a second of said at least one module is a dense fluid liquid transfer module.

5. The assembly of claim 1 further comprising a spray manifold which is attached to said fill ports and is affixed within said separation compartment through which liquid, vapor, or both may be added to the high pressure vessel.

6. The assembly of claim 1 further comprising a pressure transducer operably connected to said pressure vessel.

7. The assembly of claim 1 further comprising a thermocouple operably connected to said pressure vessel.

8. The assembly of claim 1 further comprising a basket which removably mates within said centrifuge drum.

* * * * *